US009352258B2

(12) United States Patent
Park et al.

(10) Patent No.: US 9,352,258 B2
(45) Date of Patent: May 31, 2016

(54) LIQUID COLLECTING PERMEABLE STRUCTURES

(71) Applicant: Massachusetts Institute of Technology, Cambridge, MA (US)

(72) Inventors: Kyoo-Chul Park, Cambridge, MA (US); Shreerang S. Chhatre, Cambridge, MA (US); Gareth H. McKinley, Acton, MA (US); Robert E. Cohen, Jamaica Plain, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 66 days.

(21) Appl. No.: 14/152,432

(22) Filed: Jan. 10, 2014

(65) Prior Publication Data

US 2014/0190352 A1   Jul. 10, 2014

Related U.S. Application Data

(60) Provisional application No. 61/751,039, filed on Jan. 10, 2013.

(51) Int. Cl.
*B01D 39/00* (2006.01)
*B01D 39/08* (2006.01)

(52) U.S. Cl.
CPC ...... *B01D 39/083* (2013.01); *B01D 2239/0428* (2013.01)

(58) Field of Classification Search
CPC ............... B01D 39/83; D06M 11/36; D06M 11/45–11/46; D06M 11/78
USPC ............... 95/285; 55/501, 511, 524; 422/129, 422/181, 240, 417; 427/8; 428/221, 323, 428/447, 702
See application file for complete search history.

(56) References Cited

U.S. PATENT DOCUMENTS

2010/0130082 A1* 5/2010 Lee et al. ............... 442/181
2011/0104021 A1* 5/2011 Curello et al. ......... 422/240

* cited by examiner

*Primary Examiner* — Jason M Greene
*Assistant Examiner* — Karla Hawkins
(74) *Attorney, Agent, or Firm* — Steptoe & Johnson LLP

(57) ABSTRACT

A structure for collecting liquid droplets from an aerosol can have a structure and properties that are selected for efficient liquid collection. In particular, the strand radius and spacing of a mesh, and a material for coating the mesh, can be selected to provide efficient collection of water droplets from fog.

19 Claims, 19 Drawing Sheets

LIQUID COLLECTING PERMEABLE STRUCTURES

PRIORITY CLAIM

This application claims priority to U.S. Provisional Application 61/751,039, filed Jan. 10, 2013, which is incorporated by reference in its entirety.

TECHNICAL FIELD

The present invention relates to a liquid collecting permeable structures.

BACKGROUND

According to WHO statistics, less than 0.007% of all water on the earth is readily accessible for human consumption. About a billion people lack access to safe drinking water. More than 3.5 million people die every year due to water-related diseases. Water insecurity is one of the leading causes for school dropouts, especially among girls, and more than 200 million working hours are spent (almost exclusively by women) daily for the collection of domestic water.

The water crisis is worsened in arid parts of the world due to abuse of groundwater, water-intensive crop cultivation, rapid industrialization, and changing lifestyle. In some dry regions, the appearance of fog in the early morning is common. Fog is a completely untapped water resource. Fog harvesting provides an opportunity to "produce" water locally for rural communities, which will reduce the stress on groundwater. Consider a country like Chile, where a persistent advection fog is occurs due to the long and mountainous coastline. By one estimate, 10 billion m³ of fog water per year is available in Chile. Currently, water consumption in northern Chile is 391 million m³ per year, i.e., only 4% of the total water content in the fog. Water collection from fog harvesting thus has enormous potential to locally satisfy the need for a pure and dependable supply of water in arid locations.

SUMMARY

Highly efficient permeable structures for collection of liquid droplets or small particles are described. The surface wetting properties and topography of the material can guide the design of the permeable structures. For example, the fog harvesting ability of woven meshes can be increased greatly by judiciously choosing the physico-chemical properties of the mesh surfaces. A working model for the interaction of liquid with the permeable structures allows design of highly efficient liquid collecting structures for a variety of possible conditions.

The permeable structures can be used for applications including fog harvesting; elimination of mist in engines and turbines; or elimination of small droplets or colloidal particles in the chemical process industries. These mist eliminators decrease pressure drops across unit operations, such as distillation columns, and therefore save energy required for pumping. Filters based on the permeable structures can selectively capture hazardous colloidal emissions based on size.

In one aspect, a device for collecting droplets of a liquid from an aerosol can include an aerosol-permeable structure including strands having a characteristic radius, and a characteristic spacing, a characteristic spacing ratio, wherein the outermost surface of the strands includes a material having a low contact angle hysteresis for the liquid.

In certain circumstances, the material and the characteristic spacing can be selected such that liquid droplets adhered to the structure will drain from the structure under gravity.

In certain circumstances, the characteristic radius can be R, the characteristic spacing can be 2D, and the spacing ratio can be D*=(R+D)/R, and the radius and the spacing can be selected such that 2≤D*≤4.

In certain circumstances, the spacing can be selected such that $$r_e \approx \frac{4\pi\gamma_{lv}\sin^2\theta(1+\cos\theta_{rec})}{\rho_{air}v_0^2 C_D(\theta-\sin\theta\cos\theta)}$$

where $\gamma_{LV}$ is the surface tension of the liquid, $\theta=(\theta_{adv}+\theta_{rec})/2$ is the mean contact angle of the droplet on the surface, and $\theta_{adv}$, $\theta_{rec}$ are the advancing contact angle and receding contact angle, respectively, and $$r_c \approx \sqrt{\frac{12\gamma_{lv}(\cos\theta_{rec}-\cos\theta_{adv})}{\pi\rho_{water}gB(3+B^2)}} \quad (3)$$

where $B=(1-\cos\theta)/\sin\theta$, $\rho$ is the density of the liquid, and g is the gravitational constant.

In certain circumstances, the liquid can be water.

In certain circumstances, the material can be a hydrophobic material.

In certain circumstances, the structure can be a woven mesh.

In certain circumstances, the material can include a polyhedral oligomeric silsesquioxane (POSS) and a poly(acrylate).

In certain circumstances, the polyhedral oligomeric silsesquioxane (POSS) can be a fluorinated polyhedral oligomeric silsesquioxane, and the poly(acrylate) can be poly(methyl methacrylate), poly(ethyl methacrylate), or a combination thereof.

In another aspect, a method for collecting droplets of a liquid from an aerosol can include providing a device and contacting an aerosol including droplets of the liquid with the structure.

In certain circumstances, the aerosol can be a fog.

In certain circumstances, the method can include providing a second device downwind of the first device.

In another aspect, a method of making a device for collecting droplets of a liquid from an aerosol includes identifying aerosol conditions, wherein the conditions include an average droplet size of the aerosol and a wind velocity of the aerosol, selecting a characteristic radius, a characteristic spacing, and a characteristic spacing for strands of an aerosol-permeable structure, so as to provide efficient droplet collection for the identified conditions, selecting a material having a low contact angle hysteresis for the liquid, and applying the material to form the outermost surface of the strands.

In certain circumstances, the material and the characteristic spacing can be selected such that liquid droplets adhered to the structure will drain from the structure under gravity.

In certain circumstances, the characteristic radius can be R, the characteristic spacing can be 2D, and the spacing ratio can be D*=(R+D)/R, and the radius and the spacing can be selected such that 2≤D*≤4.

In certain circumstances, the spacing can be is selected such that $$r_e \approx \frac{4\pi\gamma_{lv}\sin^2\theta(1+\cos\theta_{rec})}{\rho_{air}v_0^2 C_D(\theta-\sin\theta\cos\theta)}$$

where $\gamma_{LV}$ is the surface tension of the liquid, $\theta=(\theta_{adv}+\theta_{rec})/2$ is the mean contact angle of the droplet on the surface, and $\theta_{adv}$, $\theta_{rec}$ are the advancing contact angle and receding contact angle, respectively, and $$r_c \approx \sqrt{\frac{12\gamma_{lv}(\cos\theta_{rec}-\cos\theta_{adv})}{\pi\rho_{water}gB(3+B^2)}} \quad (3)$$

where $B=(1-\cos\theta)/\sin\theta$, $\rho$ is the density of the liquid, and g is the gravitational constant.

In certain circumstances, the liquid can be water.

In certain circumstances, the material can be a hydrophobic material.

In certain circumstances, the structure can be a woven mesh.

In certain circumstances, the material can include a polyhedral oligomeric silsesquioxane (POSS) and a poly(acrylate).

In certain circumstances, the polyhedral oligomeric silsesquioxane (POSS) can be a fluorinated polyhedral oligomeric silsesquioxane, and the poly(acrylate) is poly(methyl methacrylate), poly(ethyl methacrylate), or a combination thereof Other aspects, embodiments, and features will be apparent from the following description, the drawings, and the claims.

BRIEF DESCRIPTION OF THE DRAWINGS

FIG. 2A is an illustration indicating the stream surfaces of fog laden wind and their divergence after passing through a woven mesh surface. FIG. 2B is an enlarged drawing focusing on the interaction between incoming fog droplets and a horizontal mesh element. FIG. 2C is a contour plot of the fog harvesting efficiency ($\eta$) s a function of the ratio of radius of the fog droplets to the radius of the wire (R*=$r_{fog}$/R) and the spacing ratio of the woven mesh (D*=(R+D)/R).

FIG. 3C shows a plot that identifies the range of droplet sizes where the forces of adhesion dominate the drag forces, and establishes a criterion for a threshold droplet size for re-entrainment. FIG. 3D shows a plot that represents a second constraint arises from comparing the weight of the droplet with the surface pinning force arising from contact angle hysteresis. The threshold size where gravity dominates hysteretic pinning can be decreased by minimizing CAH=$\cos\theta_{rec}-\cos\theta_{adv}$. FIG. 3E shows a graph depicting the design space constructed from two dimensionless parameters related to work of adhesion (abscissa) and contact angle hysteresis (ordinate) depicts the relative resistance to re-entrainment and drainage. Measured values for droplets of water (V "10 µL) deposited on several different coatings are shown in the plot. Wetting characteristics corresponding to a higher work of adhesion and lower contact angle hysteresis are ideal for the maximum fog collection efficiency.

FIGS. 9A-9C show design chart based on spacing ratio D* and dimensionless width R*. FIG. 9D displays the experimentally observed collection efficiency for the 5 dip-coated wire meshes along with coated and uncoated Raschel mesh.

DETAILED DESCRIPTION

Figure 1:
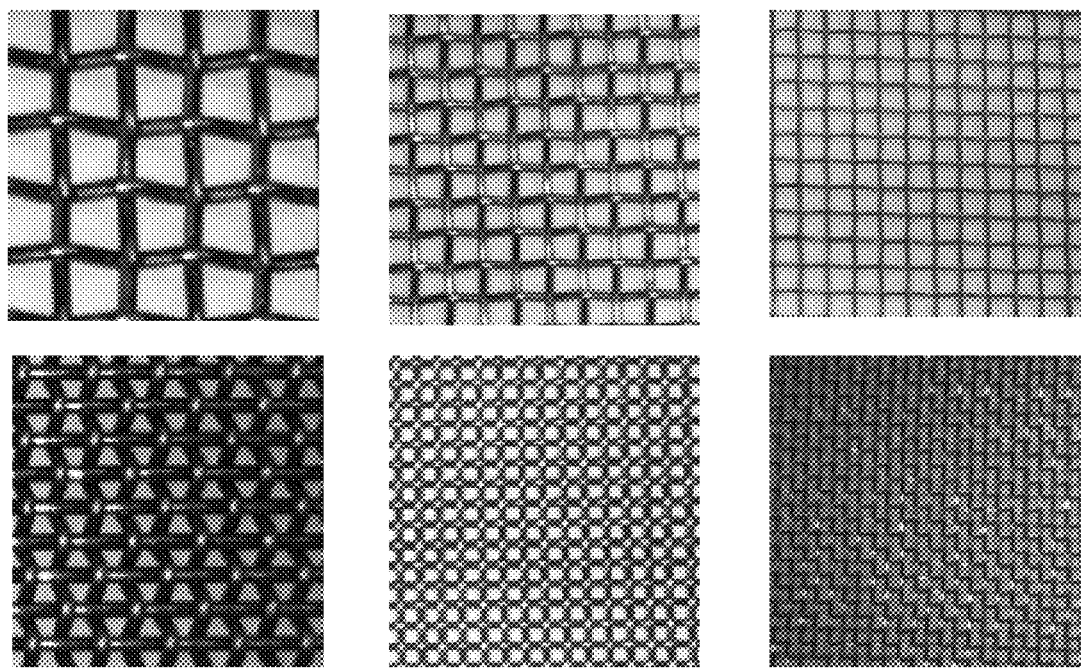
FIG. 1 is a series of microscope images of various permeable structures with different wire radii (R) and spacing ratio (D*).

A design framework can guide the design and selection of a liquid-collecting structure having enhanced efficiency for a given environmental or operating condition. Accordingly, engineered surfaces can have significantly higher liquid collection efficiency compared to current structures, such as Raschel meshes used in fog harvesting. The understanding provided by this framework can facilitate effective fog harvesting across many regions and conditions.

The design framework is independent of any specific material used on the permeable structures. Therefore, mesh, spring, or other permeable structures could be manufactured using materials that have desirable bulk properties (such as strength, ease of working, weight, cost, durability, and others). The permeable structures can be conformally coated to achieve desired surface properties (e.g., texture and wetting properties). For example, a metallic mesh can be mechanically robust, both structurally and against environmental wear and tear. A metallic mesh can retain a complex 3-dimensional structure that can further enhance the efficiency of liquid collection. The design framework can be applied to generally to permeable motifs, including multiple mesh systems. The design framework provides a way to selectively filter droplets or particles based on size and/or velocity in an aerosol, cloud, or fog.

An aerosol is a suspension of liquid droplets or fine solid particles in a gas. The particles are sufficiently small that they remain suspended rather than falling or settling out of the suspension. One typical example of an aerosol is a suspension of liquid particles in air. In a natural setting, an aerosol of water in air is typically referred to as fog (if close to the ground) or a cloud (if high above the ground).

Liquid aerosols typically include droplets having a size in the micrometer regime. For example, fog, mist, or colloidal particles of water in air typically have a size in the range of about 1 μm to about 40 μm. These particles/droplets are too small to settle down under gravity; they undergo Brownian motion and cannot be collected by gravity-based techniques. These droplets, however, have significantly higher density than the surrounding air mass. Therefore, when an aerosol flows around a solid object, the particles cannot follow the streamlines. They continue to travel along their initial trajectory and as a result, are intercepted by the solid object. Langmuir and Blodgett and many other researchers studied the efficacy of cylindrical objects in the capture of such small-sized particles. See, for example, Langmuir, I.; Blodgett, K. B. *A mathematical investigation of water droplet trajectories* US Air Force Tech. Rep. No. 5418: 1946; p 68; and McComber, P.; Touzot, G., *Journal of Hydrometerology* 1981, 38, 1027-1036; each of which is incorporated by reference in its entirety. They concluded that the efficiency of fog harvesting (η) increased as the radius of the cylindrical obstacle (R) decreased.

Aerosol-permeable structures (also referred to herein simply as "permeable structures") can be used to collect liquid droplets from the aerosol. An aerosol-permeable structure is a structure, having many small openings, pores, or channels through which the aerosol can pass. Preferably, the structure is sufficiently permeable to the aerosol that when the aerosol is part of a moving current, the aerosol passes primarily through the aerosol-permeable structure, rather than being primarily diverted around the structure (as would occur in the case of a solid structure). As the aerosol passes through the permeable structure, droplets impact the permeable structure and are retained there. As more droplets impact, the droplets coalesce. The coalesced droplets can then be collected (e.g., by flowing or dripping from the structure by gravity, or by mechanical agitation of the structure to dislodge the coalesced droplets).

Permeable structures suitable for liquid collection can be formed of any material possessing the necessary permeability to the aerosol. For example, the permeable structure can be a mesh, such as a woven mesh. A mesh includes many interlaced or interconnect strands. The strands can be filamentous, being much longer than they are wide. The strands can be generally cylindrical in shape. The strands can be of any material, for example, natural fibers, polymers, metals, or composite materials. The strands have an outermost surface, the properties of which can affect the efficiency of liquid collection (discussed below). The strands can be formed of a single first material, e.g., a metal, in which case the first material forms the outermost surface. In other cases, the strands can be coated with a second material (e.g., a strand composed of a metal and having a polymer coating on the metal). In this case, the second material forms the outermost surface of the strand, and the properties of the second material, rather than the first material, will influence the liquid-collecting properties of the permeable structure. In cases where the strands are coated, the coating can be applied prior to forming the mesh, or after the mesh is formed.

The mesh can have a regular or irregular pattern of strands. In some cases, the strands of a mesh can have different radii; in other cases, the strands will all have the same radius. A regular pattern of strands involves a set of strands aligned in parallel with each other and repeating at regular intervals. Typically it also involves a second set of strands aligned in parallel with each other but set at an angle to the first set. In one simple example, the mesh can have a simple pattern with two sets of strands set at right angles, and repeating with the same interval in both directions.

A mesh, particularly a simple mesh, can be characterized according to the dimensions of the mesh and its component strands. Thus, a simple mesh can have strands having a characteristic radius. The strands can have a characteristic spacing between adjacent parallel strands. Typically the spacing will be the same along both the length and width, but this is not necessarily so. Thus, a mesh can have a first characteristic spacing in one direction, and a different second characteristic spacing in the other direction. The mesh can also have a characteristic spacing ratio, which relates the characteristic radius to the characteristic spacing, as explained further below. The spacing ratio describes the closeness of the mesh, in other words, across a large section of the mesh, how much surface area the strands cover.

A spacing ratio, $D^*$, can be defined as follows: if R is the cross-sectional radius of a strand, and 2D is the spacing between adjacent strands, the spacing ratio is defined as $D^* = (R+D)/R$. The closeness of the mesh can also be represented as a shading coefficient (SC), which is the fraction of projected area that is occluded by the solid mesh texture.

The permeable structure can be coated with a material chosen for its surface properties, for example, its wetting properties. Wetting properties include hydrophobicity, hydrophilicity, oleophobicity, oleophilicity, advancing contact angle, receding contact angle, static contact angle, contact angle hysteresis and other properties. Suitable coating materials include polymers (e.g., hydrophobic polymers). One such example is polyhedral oligomeric silsesquioxanes (POSS), and blends of POSS with other polymers, such as polyacrylates and fluoropolymers, for example, Tecnoflon. Exemplary polyacrylates include poly(methyl methacrylate), poly(ethyl methacrylate), or poly(butyl methacrylate). Other materials can be added to the coating material to afford other properties, such as titania particles, (e.g., titania nanoparticles) which can exhibit photocatalytic self-cleaning properties. The coating material can also be chosen for its texture. In some cases, the material may be smooth; or it may have a degree of roughness. Roughness may be found at the nanometer scale, the micrometer scale, or larger scales. A second liquid (ex. Krytox oil) which is insoluble in water can be impregnated in the asperities of the texture.

Polyhedral oligomeric silsesquioxanes (POSS) molecules have a rigid silsesquioxane cage surrounded by optionally substituted alkyl groups, e.g., fluoro-alkyl groups. A number of different molecules with different organic groups, such as 1H,1H,2H,2H-heptadecafluorodecyl (fluorodecyl POSS) and 1H,1H,2H,2H-tridecafluorooctyl (fluorooctyl POSS), have now been synthesized. Fluorinated POSS molecules contain a very high surface concentration of fluorine containing groups, including $—CF_2$ and $—CF_3$ moieties. The high surface concentration and low surface mobility of these groups, as well as the relatively high ratio of $—CF_3$ groups with respect to the $CF_2$ groups results in one of the most hydrophobic and lowest surface energy materials available today.

See, for example, Owen, M. J. & Kobayashi, H. Surface active fluorosilicone polymers. Macromol. Symp. 82, 115-123 (1994). Blends of a moderately hydrophilic polymer, poly(methyl methacrylate) (PMMA) and fluorodecyl POSS can be used in various weight ratios to create materials with different surface properties. Other polymers can be used in place of or in combination with other polymers. By varying the mass fraction of POSS blended with various polymers, the surface energy of the polymer-POSS blend can be systematically changed. See, for example, WO 2009/009185, which is incorporated by reference in its entirety Meshes, e.g., woven meshes, having cylindrical fibers are commercially available over a wide range of wire radii and spacings (as shown in FIG. 1). Woven meshes can be a suitable material for fog harvesting structures because of their relatively low cost (e.g., $5 to $10 per sq. ft.), wide availability, and mechanical robustness. Their regular geometric structure also facilitates quantitative study, modeling, and design of their fog harvesting properties. A comprehensive model to analyze the efficiency of water collection (ii) using woven meshes has been described (Rivera, J. D., *Atmospheric Research* 2011, 102, 335-342, which is incorporated by reference in its entirety). The efficiency $\eta$ can be represented in terms of two independent, dimensionless variables. The first is the spacing ratio, $D^*$. The second, $R^*$ is the ratio of the radius of fog droplets ($r_{fog}$) to the radius of the mesh wire (R), i.e., $R^* = r_{fog}/R$.

Figures 2A, 2B:
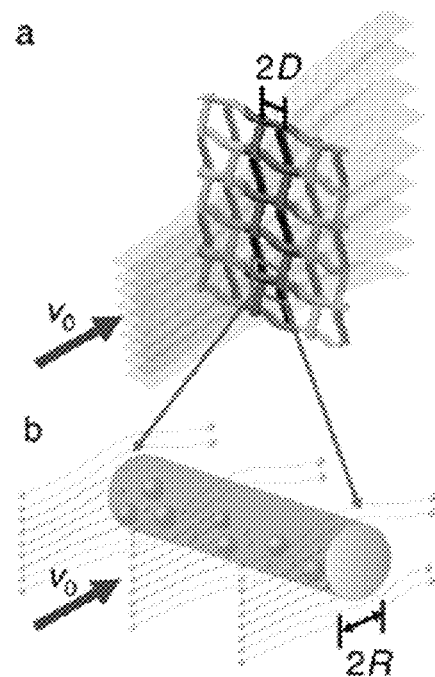
FIGS. 2A-2C are a diagrams depicting fog flow through a woven mesh surface, and a contour plot of the fog harvesting efficiency.

The overall collection efficiency is a product of i) the aerodynamic collection efficiency ($\eta_a$) and ii) the subsequent deposition efficiency ($\eta_d$) (Rivera, J. D., *Atmospheric Research* 2011, 102, 335-342, which is incorporated by reference in its entirety). Rivera argued that the aerodynamic collection efficiency accounts for the fraction of fog flow that is directed towards the solid portion of the mesh. The high Reynolds number (Re>>1) flow around the mesh (FIG. 2A) is modeled as a linear combination of the flow around an impermeable rigid solid (i.e., $D^* = 1$), and an unobstructed uniform flow. FIG. 2B is an enlarged view, in which droplets that are closer to the central axis are trapped on the cylindrical wire, whereas droplets closer to the periphery follow the streamline around the wire. Droplets on the wire coalesce, and once they grow past a threshold size, they drain under gravity. Due to the no slip and no penetration boundary conditions at the solid surface, the wind speed is locally reduced in the vicinity of the mesh elements. This momentum defect is modeled in terms of a drag coefficient for the overall structure ($C_D \approx 1.18$) and the aerodynamic collection efficiency is ultimately expressed as $\eta_a = SC/(1+\sqrt{C_0/C_D})$, where $C_0$ is the pressure drop coefficient for a cylindrical mesh given as $C_0 = 1.44[1.3SC + (SC/(1-SC))^2]$. The collection efficiency is not simply equal to the shade coefficient of the mesh, but changes nonmonotonically with the openness of the mesh and the aerodynamic characteristics of the flow through the mesh. As $D^*$ increases from unity (an impermeable plate), the aerodynamic collection efficiency ($\eta_a$) increases from zero as the lateral deflection of the air stream is diminished. Beyond a local maximum at $D^*_{crit} \approx 3.1$ (or equivalently, $SC \approx 0.55$), most fog droplets pass through the void area between wires without being deflected and $\eta_a$ decreases.

The deposition efficiency ($\eta_d$) quantifies the fraction of fog droplets that are actually deposited from the population initially headed towards the solid wires. In their seminal work, Langmuir and Blodgett used numerical calculations to develop an empirical correlation for the deposition of small particles on an infinitely long cylinder (Langmuir I, Blodgett KB (2004) A mathematical investigation of water droplet trajectories. Collected works of Irving Langmuir (Pergamon Press, Oxford), which is incorporated by reference in its entirety.); the deposition efficiency ($\eta_d \approx St/(St+\pi/2)$) monotonically increases as the dimensionless radius ratio $R^*$ increases, i.e. cylinders with progressively smaller radii are more efficient collectors.

Figure 2C:
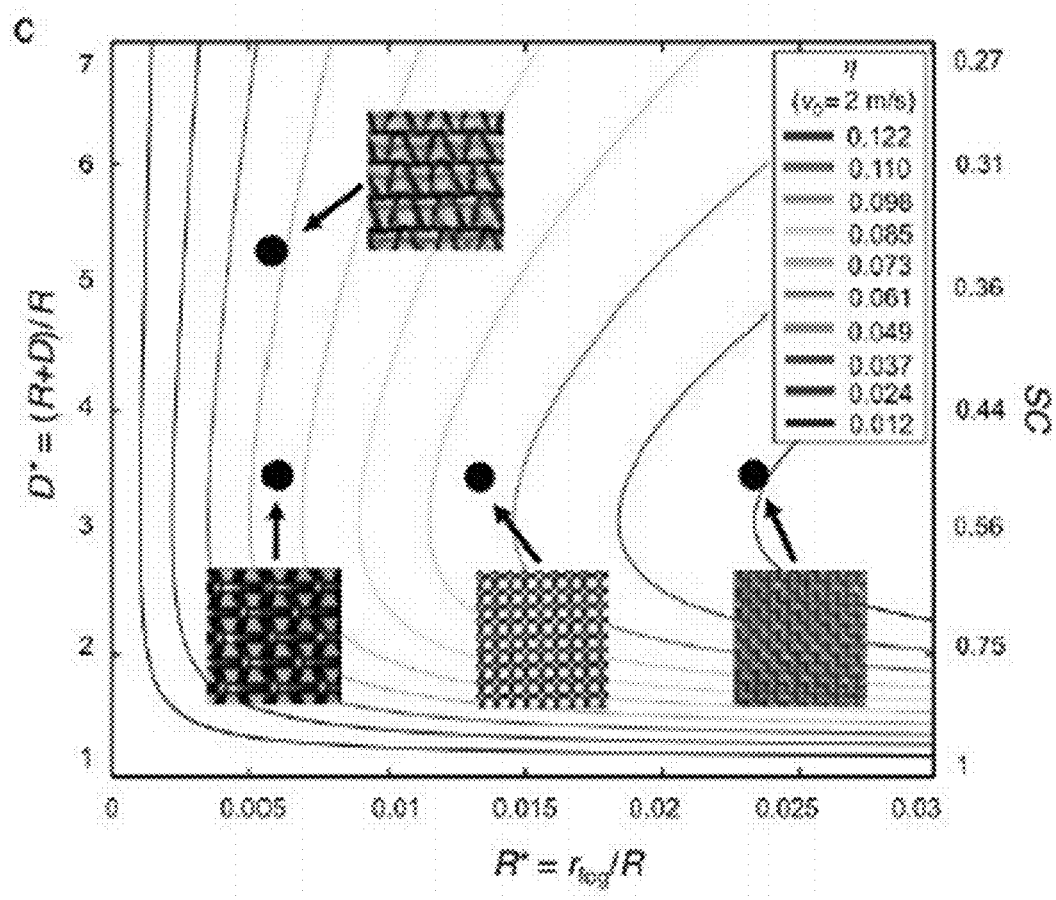

The resultant overall collection efficiency from the two components $$\eta = \eta_a(D^*)\eta_d(R^*) = \left[\frac{SC}{1+\sqrt{C_0/C_d}}\right]\left[\frac{St}{St+\pi/2}\right] \qquad (1)$$

is shown in FIG. 2C as a contour map in $R^*$, $D^*$ parameter space, assuming a wind velocity of 2 m/s and uniform droplet size $r_{fog} \approx 3$ μm (0≤St≤4). The contours indicate that the collection efficiency of a conventional Raschel mesh ($D^* \approx 5.1$, $R^* \approx 0.005$; $\eta \approx 4.8\%$) is much lower than that of a thinner and denser wire mesh ($D^* \approx 3.5$, $R^* \approx 0.024$; $\eta \approx 12\%$). The contour map can also be used as a design chart for selecting an optimal mesh by choosing $D^*$ (or SC) and maximizing $R^*$. The chart can be employed to estimate the maximum fog collection efficiency and evaluate the amount of collected water expected for a specific mesh surface, if the characteristic wind speed of the fog ($v_0$), liquid water content, total mesh area, and collection time are known.

In the design chart presented in FIG. 3, contours of efficiency of aerosol harvesting ($\eta$) are plotted as a function of spacing ratio ($D^*$) and $R^*$. The contours correspond to different values of $r_{fog}$, shown at upper right in FIG. 3. The efficiency increases monotonically with increasing value of $R^*$, i.e., decreasing size of the cylindrical strands (R). On the contrary, the variation of η with D* is not monotonic. Instead, the efficiency goes through a maximum value at intermediate spacing ratios, i.e., the optimal value of D* is between about 3 and about 4. When the spacing ratio is small (D* approaching 1), the aerosol harvesting efficiency is close to zero. At such low spacing ratios, the mesh behaves like an impermeable solid object: the gas, along with the liquid droplets suspended in it, are deflected around the mesh. As a result, very few droplets impact the mesh, resulting in a low collection efficiency. As D* increases, the openness of the mesh increases, and the airflow is perturbed to a smaller extent. As a result, more droplets impact the cylindrical strands of the mesh and the collection efficiency increases. However, as D* increases further, less solid material per unit projected area is available for droplets to impact, and therefore the efficiency decreases. At still larger value of D*, the strands of the woven mesh are far away from each other, and most fog droplets go through the mesh without being intercepted by the solid strands. Therefore, there is a trade-off between the two effects, i.e., deflection of the air stream around an impermeable blunt body at low D*, and passage of the air stream through the mesh at high D*. As a result, the optimal efficiency for collection of liquid droplets is expected for a mesh with low R and intermediate value of D* (D*≈3 to 3.5).

Based on the design chart, the mesh surface with highest efficiency for a given aerosol condition (characterized by a particular size of the liquid droplet and gas velocity) can be selected. Note that efficiency increases moving from left to right on the x-axis of FIG. 3. Therefore, for a given mesh with wire radius R, the efficiency of collection is highest for the largest droplets ($r_{fog}$). Because the volume of a droplet is directly proportional to the cube of its radius, mesh surfaces that are highly effective in capturing large droplets will harvest most of the liquid volume fraction in the aerosol.

The design chart outlined FIG. 2C can be extended to other permeable surfaces like springs. An array of springs can be used to capture tiny droplets of water in a moving column of air. Springs are symmetric structures, and therefore fog collectors made of springs will perform equally well irrespective of the direction of fog-laden wind. The spacing between two helical elements of a spring can be tuned by applying a tension/compression in the vertical direction. Therefore, the spacing ratio (D*) or shade coefficient can be chosen based on the incoming wind velocity and other physical properties of the system.

Figure 3A:
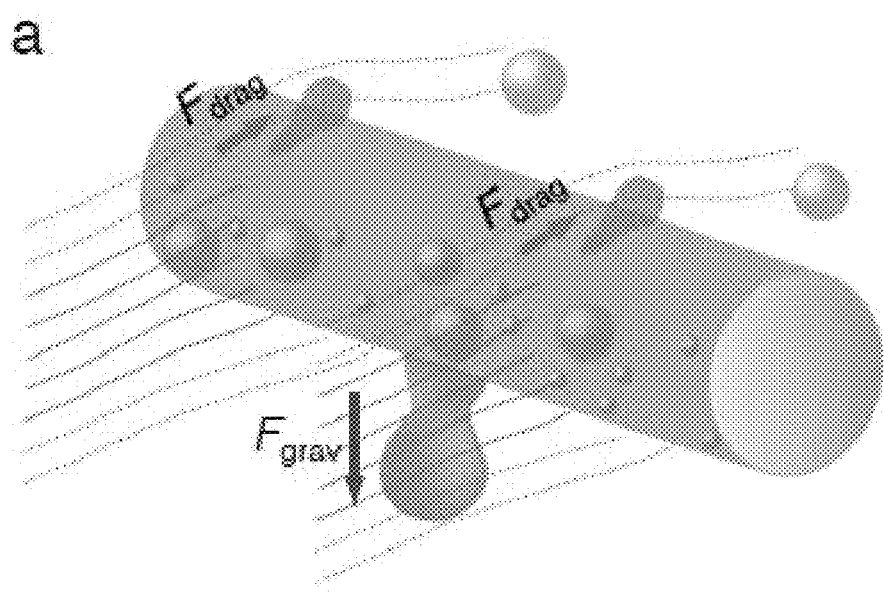
FIGS. 3A-3E represent two factors that reduce collection efficiency, and the surface modification design space that depicts the relative resistance to re-entrainment and drainage. Two factors that inhibit fog harvesting and reduce collection efficiency are (FIG. 3A) re-entrainment of collected droplets in the wind and (FIG. 3B) blockage of the mesh.
Figure 3B:
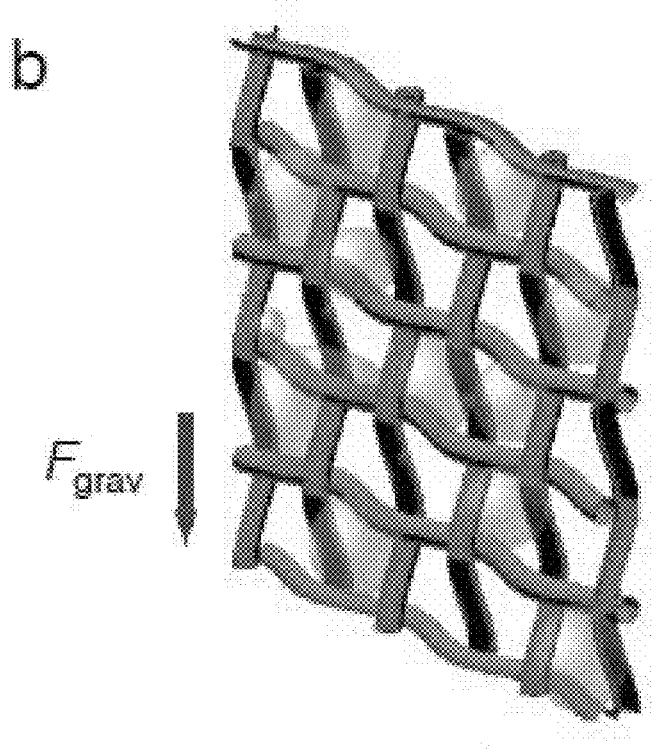

The theoretical collection efficiency anticipated from this design framework for meshes can be adversely affected in actual performance due to two issues that depend on the surface wettability; i) convective loss of deposited droplets (or re-entrainment; as shown schematically in FIG. 3A) and ii) mesh clogging that modifies the local aerodynamics (FIG. 3B). Re-entrainment arises from aerodynamically-induced detachment of deposited water droplets back into the air stream before they can reach the critical volume at which gravitational drainage dominates. As the small deposited water droplets coalesce, the growing droplets are influenced by the competition between aerodynamic drag forces and surface adhesion forces. See, for example, 24. Milne A J B, Amirfazli A (2009) Drop shedding by shear flow for hydrophilic to super-hydrophobic surfaces. Langmuir 25:14155-14164, and Ledesma-Aguilar R, Nistal R, Herńandez-Machado A, Pagonabarraga I (2011) Controlled drop emission by wetting properties in driven liquid filaments. Nat. Mater. 10:367-371, each of which is incorporated by reference in its entirety. When $F_{drag} > F_{adhesion}$, the droplets are re-entrained in the fog flow, leading to a decrease in the fog collection efficiency (FIG. 3A).

In FIG. 3B a second problem that occurs on a mesh when the deposited liquid volume becomes large is identified. In the clogging region, the hysteretic wetting force pinning a droplet in the interstices of the mesh exceeds the gravitational draining force when the deposited water droplet size is less than a critical volume. The void area between mesh elements could become occluded by these pinned (non-draining) drops, depending on the half spacing of the mesh as discussed below. Such clogged parts of the mesh are impermeable and obstruct the local wind, significantly hampering the overall fog-harvesting ability of the grid. The effective void fraction approaches zero (or $D^*_{effective} \to 1$) as the mesh clogs and the aerodynamic collection becomes zero.

Figure 3C:
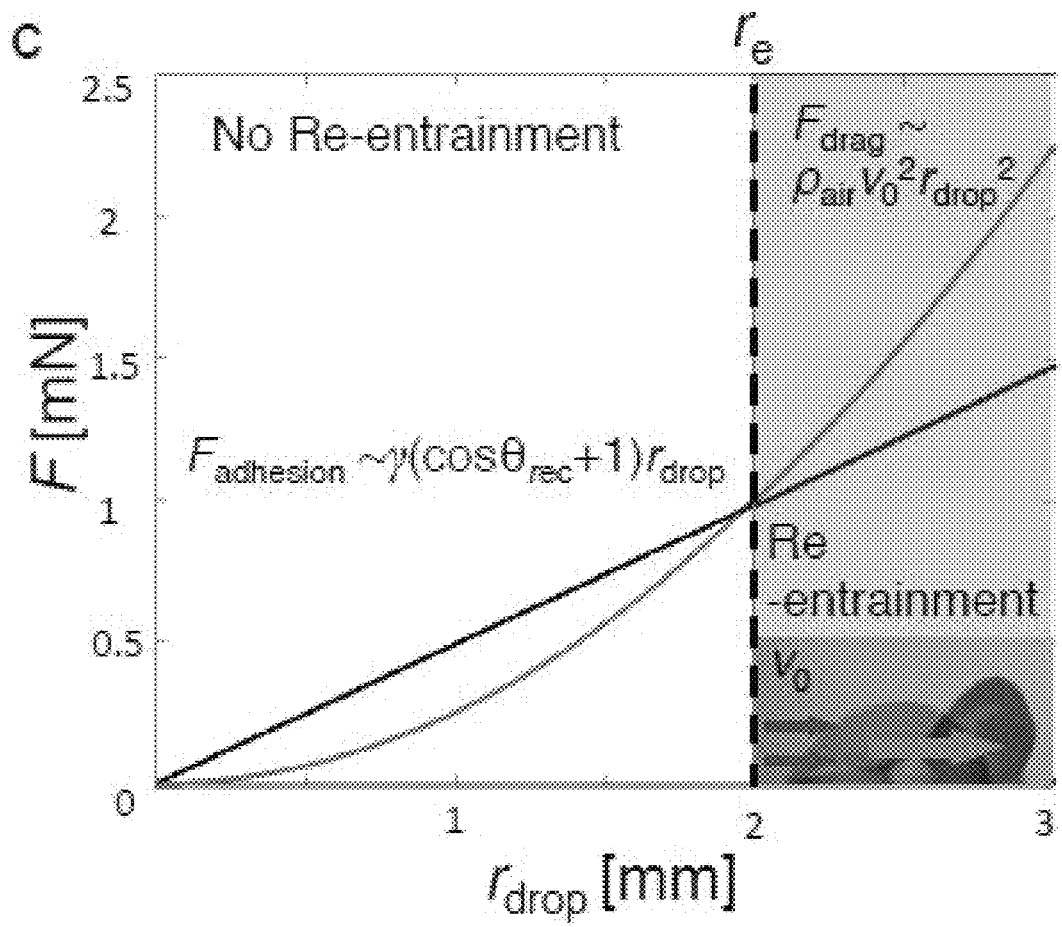

To overcome these two challenges and to design fog collection mesh surfaces with high efficiency in practice, the two critical water drop radii—denoted $r_e$ and $r_c$ in FIGS. 3C, D—that are sensitive to the physico-chemical surface properties of the meshes are considered. In FIG. 3C, the right-most shaded region represents the range of paramater space where the aerodynamic drag force (which grows as $F_{drag} \approx \rho v_0^2 r^2_{drop}$) exceeds the adhesion force (which grows as $F_{adhesion} \approx \gamma_{LV} (1+\cos \theta_{rec}) r_{drop}$); droplet re-entrainment is expected in this region where $F_{drag} > F_{adhesion}$. A detailed force balance on a spherical cap gives a critical droplet radius at which these two forces balance each other:

$$r_e \approx \frac{4\pi \gamma_{lv} \sin^2 \theta (1 + \cos\theta_{rec})}{\rho_{air} v_0^2 C_D (\theta - \sin\theta \cos\theta)} \quad (2)$$

where $\gamma_{LV}$ is the surface tension of water, $\theta = (\theta_{adv} + \theta_{rec})/2$ is the mean contact angle of the droplet on the surface, and $\theta_{adv}$, $\theta_{rec}$ are the advancing contact angle and receding contact angle, respectively (see below for details). A droplet with radius $r_{drop} > r_e$ is susceptible to re-entrainment. To reduce re-entrainment, the slope of the adhesion force curve, which is proportional to the work of adhesion $\gamma_{LV} (1+\cos \theta_{rec})$, must be increased. This can be achieved in practice by lowering the receding contact angle $\theta_{rec}$.

Figure 3D:
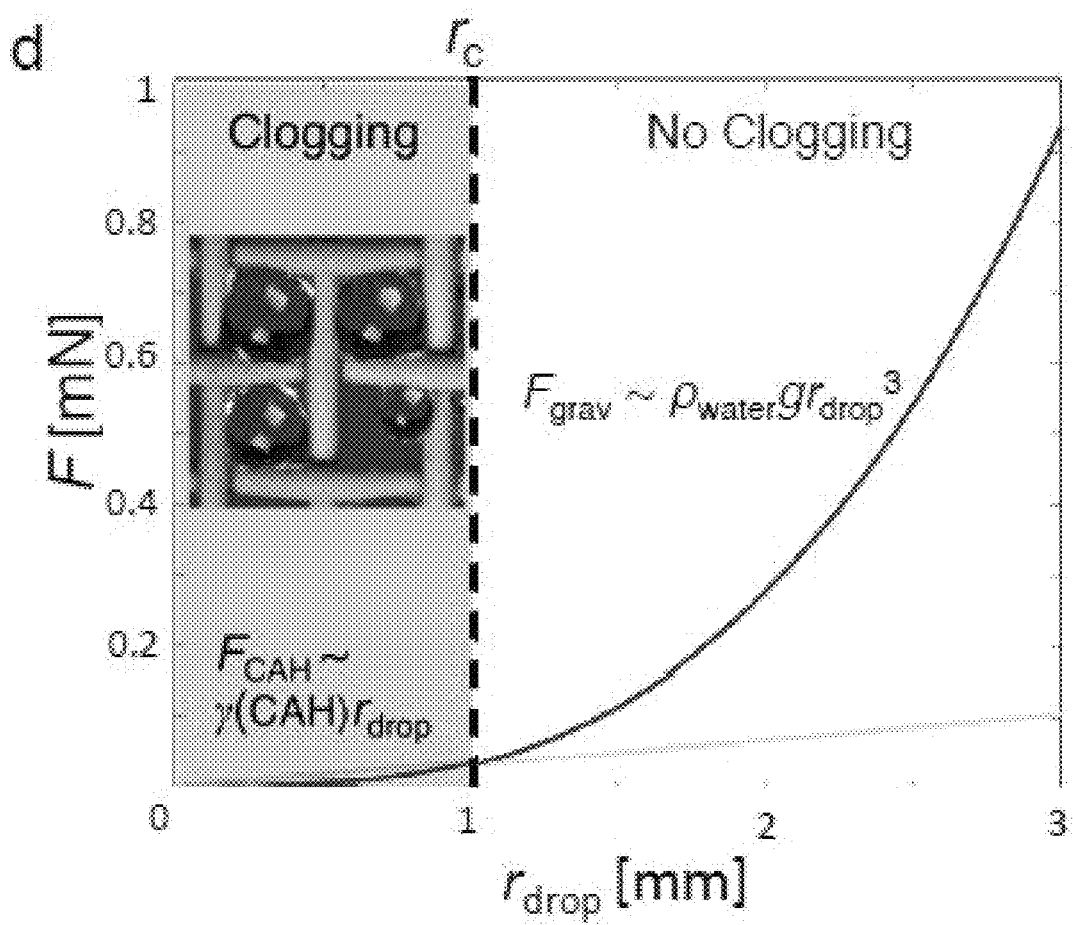

As the droplets grow on the mesh, gravity has to overcome the surface pinning force in order to shed these collected droplets into the collecting gutter at the base of the mesh. Balancing the the gravitational body force $F_{grav} \approx \rho g r^3_{drop}$ with the hysteretic force $F_{CAH} \approx \gamma_{LV} (CAH) r_{drop}$ that characterizes depinning of a liquid droplet in the interstitial gap of a woven mesh with a simple square weave. Setting $F_{grav} = F_{CAH}$ gives a second critical radius for 'choking' or clogging of the mesh $$r_c \approx \sqrt{\frac{12\gamma_{lv}(\cos\theta_{rec} - \cos\theta_{adv})}{\pi \rho_{water} g B(3+B^2)}} \quad (3)$$

where $B=(1-\cos \theta)/\sin \theta$ (see below for additional details). FIG. 3D shows that mesh-clogging as a result of contact line pinning can be reduced (i.e. the minimum droplet size $r_c$ that will freely drain off the mesh) by developing surface coatings with smaller values of the contact angle hysteresis CAH=cos $\theta_{rec}$ −cos $\theta_{adv}$ For an ideal fog-collecting surface, liquid droplets convected towards the mesh and deposited on the surface will be drained quickly by gravity into the collecting gutter without loss by re-entrainment to the airflow, thus refreshing the base mesh surface for capture of new fog droplets. Design of an improved mesh to maximize fog collection efficiency thus involves: I) minimizing rc to avoid clogging, II) maximizing re to reduce re-entrainment, while also III) selecting a mesh opening near the optimal aerodynamic value of $D^* \approx 3.1$ and IV) maximizing R* to the extent possible.

The surface forces controlling adhesion and hysteresis depend upon the physico-chemical surface characteristics of the mesh (Quere D (2008) Wetting and roughness. Annu. Rev. Mater. Res. 38:71-99, which is incorporated by reference in its entirety), and therefore smart engineering of suitable coatings can enable woven meshes to collect fog with improved efficiency. If $r_e >> r_c$ can be achieved by surface modifications, then the performance degradation associated with both shaded regions in FIGS. 3C, 3D can be minimized. Such a mesh surface would have both low contact angle hysteresis (CAH<<1) and a low receding contact angle ($\theta_{rec} \to 0$). This material challenge can be summarized in the surface modification design space shown in FIG. 3E. The two important design parameters are contact angle hysteresis (CAR) and a scaled work of adhesion ($W_a/\gamma_{LV}=1+\cos \theta_{rec}$) that can be exploited to rank the wetting properties of various materials for preventing clogging and re-entrainment problems. From the expression for mesh clogging ($r_c$) given in eq.(3), it is clear that a coating with extremely low hysteresis (CAH→0) will lead to a small value of the critical mesh half spacing (denoted $D_{crit}$) above which the clogging problem does not occur.

Previously deployed fog harvesting setups used a double-layered Raschel mesh made of polyolefin (denoted PO) which has $CAH^{(PO)}=\cos \theta_{rec}^{(PO)} - \cos \theta_{adv}^{(PO)} \approx 0.40$ (see Table 1). By contrast, a topographically smooth surface dip-coated with a blend of 50% POSS −50% PEMA (denoted PPD) has one of the lowest values of contact angle hysteresis reported to date; $CAH^{(PPD)}=\cos \theta_{rec}^{(PPD)} - \cos \theta_{adv}^{(PPD)} \approx 0.06$. See, for example, Meuler A J, Chhatre S S, Nieves A R, Mabry J M, Cohen R E, et al.(2011) Examination of wettability and surface energy in fluorodecyl POSS/polymer blends. Soft Matter 7:10122-10134, which is incorporated by reference in its entirety. The critical opening size for a PPD coated mesh $D_{crit}^{(PPD)} \approx 0.41$ mm is significantly smaller than $D_{crit}^{(PO)} \approx 1.5$ mm, and therefore finer meshes, if dipcoated with POSS-PEMA, will drain more readily and be less susceptible to clogging.

This hysteretic drainage criterion involves differences in the surface energies based on advancing and receding contact angles; however, from eq. (2) it is clear that the absolute magnitude of the receding contact angle is also important for preventing re-entrainment and subsequent loss of deposited droplets. The adhesive work (per unit area) required to pull a droplet off the surface (against aerodynamic drag) scales as $W_a = \gamma_{LV} (1+\cos \theta_{rec})$. Therefore, 'sticky' surfaces with low $\theta_{rec}$ (and high $W_a$) promote the adhesion of droplets on solid surfaces.

Figure 3E:
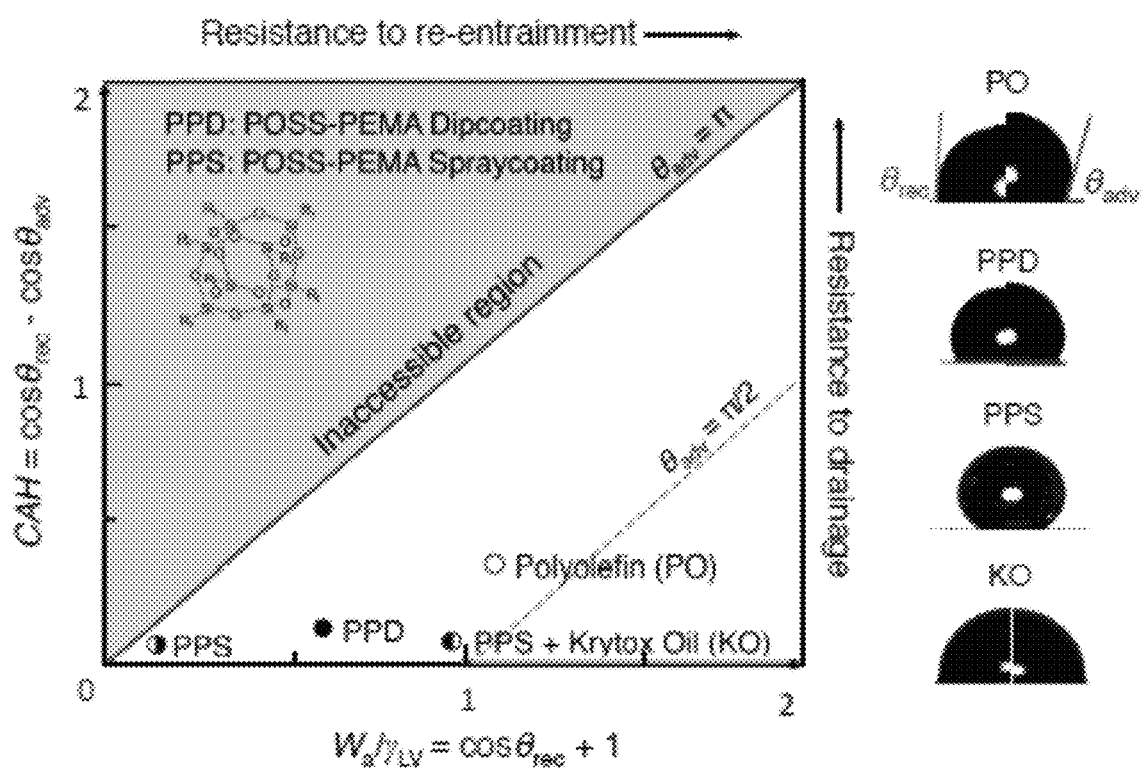

The surface properties of the POSS coating can be manipulated further by altering the deposition technique (FIG. 3E). The CAH can be further decreased to CAH≈0.01 by spray-coating the mesh to create a re-entrant roughened topography using POSS-PEMA (see, for example, Srinivasan S, Chhatre S S, Mabry J M, Cohen R E, McKinley G H (2011) Solution spraying of poly(methyl methacrylate) blends to fabricate microtextured, superoleophobic surfaces. Polymer 52:3209-3218, which is incorporated by reference in its entirety), but the receding contact angle increases to $\theta_{rec} \approx 159°$. Therefore, such spray coated meshes (denoted PPS in FIG. 3E) are extremely clogging-resistant, but the higher $\theta_{rec}$ value reduces drop adhesion which leads to greater re-entrainment and a lower overall collection efficiency. A liquid impregnated textured surface or 'SLIPS surface' (29, 30, 31) with low CAH and low $\theta_{rec}$ can be obtained by imbibing a non-volatile oil (e.g., Krytox oil) into the pores of the spray-coated surface (31). This liquid-impregnated surface (denoted KO in FIG. 3E) has CAH≈0.03 and $\theta_{rec} \approx 100°$, and therefore it is expected to harvest fog better than dip-coated or spray-coated meshes.

The fog harvesting technique described was based on physical impaction and interception of liquid droplets in a flow. The mesh surfaces captured liquid particles. In addition to water droplets, fog also includes a high level of humidity. The condensation of water vapor in this humid mass represents another source of water. Woven mesh surfaces have a large interface available for heat transfer, and by selecting the thermal emissivity and heat transfer properties of the mesh surface, harvesting of droplets in fog can be supplemented by condensation of humidity to provide additional water.

A woven mesh surface can be cooled by processes including natural convection, infrared emission, and artificial cooling through conduction. Materials that are highly emissive in the infrared (such as, for example, carbon black nanoparticles), can be used as a coating on the permeable structures to further enhance the liquid-collecting efficiency. Carbon nanoparticles can be coated by simply exposing the permeable structure to an open flame; e.g., candle soot can be a source of carbon black nanoparticles. Nanoparticles can also be added using layer-by-layer deposition. Besides infrared emissivity, nanoparticles (of any suitable material) can create structures on the micrometer and/or nanometer scale to enhance heat transfer (e.g., by increasing the effective surface area of the permeable structures).

In some circumstances, it may be beneficial to provide more than one layer of the permeable structures to increase the efficiency of liquid collection. For example, in high-velocity wind conditions, as in the case of inertial Chilean fog, droplets collected on the mesh might blow away. One more additional meshes placed downwind of the first structure can act as a barrier and capture such droplets. In another example, when fog droplets are extremely small, and the wind velocity is low, a single layered collection surface may have limited collection efficiency. One or more additional layers can be selected so that its capture elements (e.g., cylindrical wires) are aligned with the openings of the first permeable structure. Then, by adjusting the distance between the two mesh structures, fog collection can be optimiazed without significantly disturbing the wind profile. Multiple layers of mesh placed close together are likely to touch when the wind is blowing; this contact can aid the drainage of liquid droplets collected on the meshes.

The liquid-collecting permeable structures discussed above involved flat or curved woven wire mesh. Three dimensional geometries for the permeable structures are also contemplated. Examples of such three-dimensional geometries include helical springs, cones or inverted cone shapes, including one or more layers of mesh surfaces to capture omnidirectional fog/mist flow. Like a fog-well, an axially symmetric structure can show uniform collection efficiency regardless of direction of fog/mist flow. In addition, convenience for collecting liquid into a container or pipe system can be significantly enhanced by engineering the aspect ratio and symmetry of the devices.

Apart from fog harvesting, the permeable structures can be used in other applications as well. Such structures can be used (1) to eliminate mist in engines and turbines or (2) to eliminate small droplets/colloidal particles in unit operations in chemical process industries that involve pipes and reactors. These mist eliminators decrease pressure drops across unit operations like distillation columns and therefore save energy required for pumping. Demisters are used to separate liquid droplets from air in absorbers, seawater desalination plants, washers, sulphuric acid plants, vacuum columns, sound absorbers, vibration dampers, distillation and rectification plants, oil separators, evaporators, flash vessel systems, and other equipment. Filters based on such structures can selectively capture hazardous colloidal emissions based on their size. The design framework allows the construction of a size-specific "membrane" that allows particles or liquid droplets under a certain size to pass through, while almost completely blocking particles above a threshold size. Further, by appropriately tuning the wetting parameters of the surface, a membrane that selectively collects a few liquids while letting other liquids go through can also be constructed.

EXAMPLES

Figure 4:
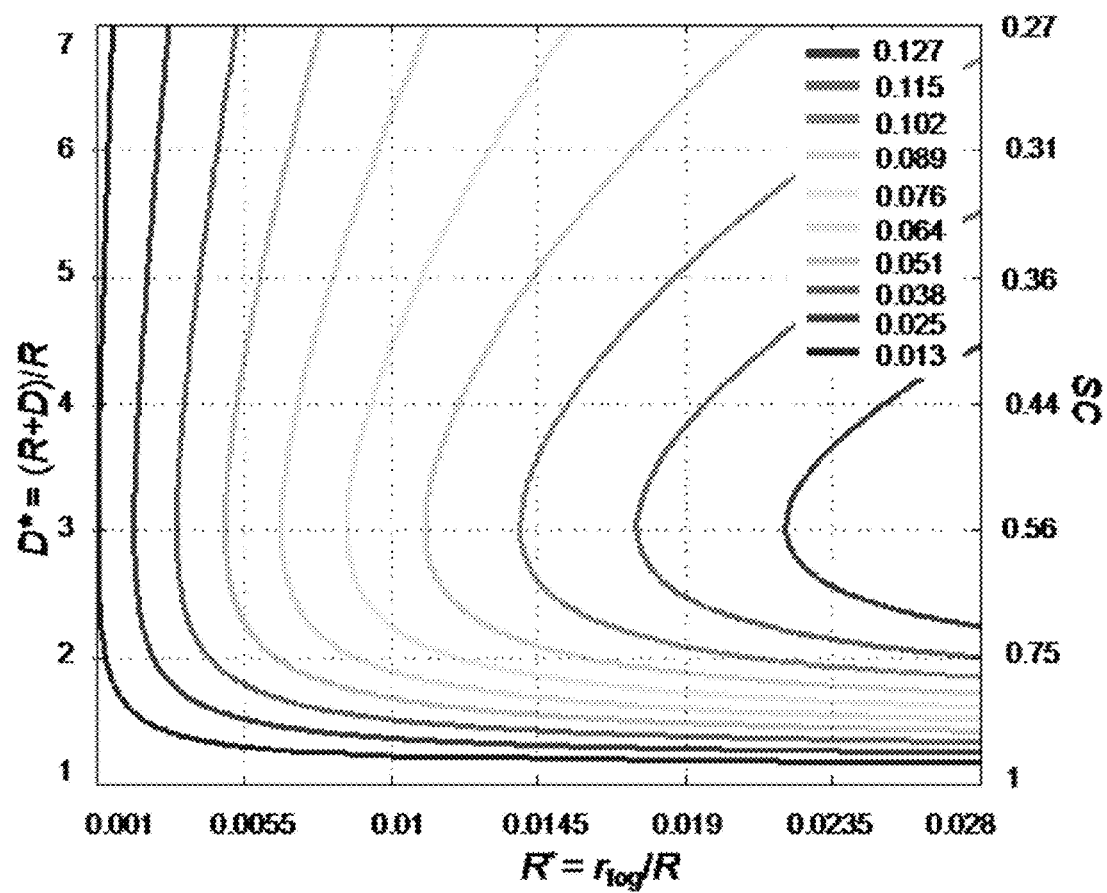
FIG. 4 is a contour map of the predicted aerodynamic capture efficiency of fog droplets of radius $r_{fog}$ using a mesh with a wire radius R and a spacing ratio D*, assuming a wind velocity of 2 m/s. The efficiency is expected to increase with decreasing R (increasing R*) and at an intermediate value of D*.
Figure 5:
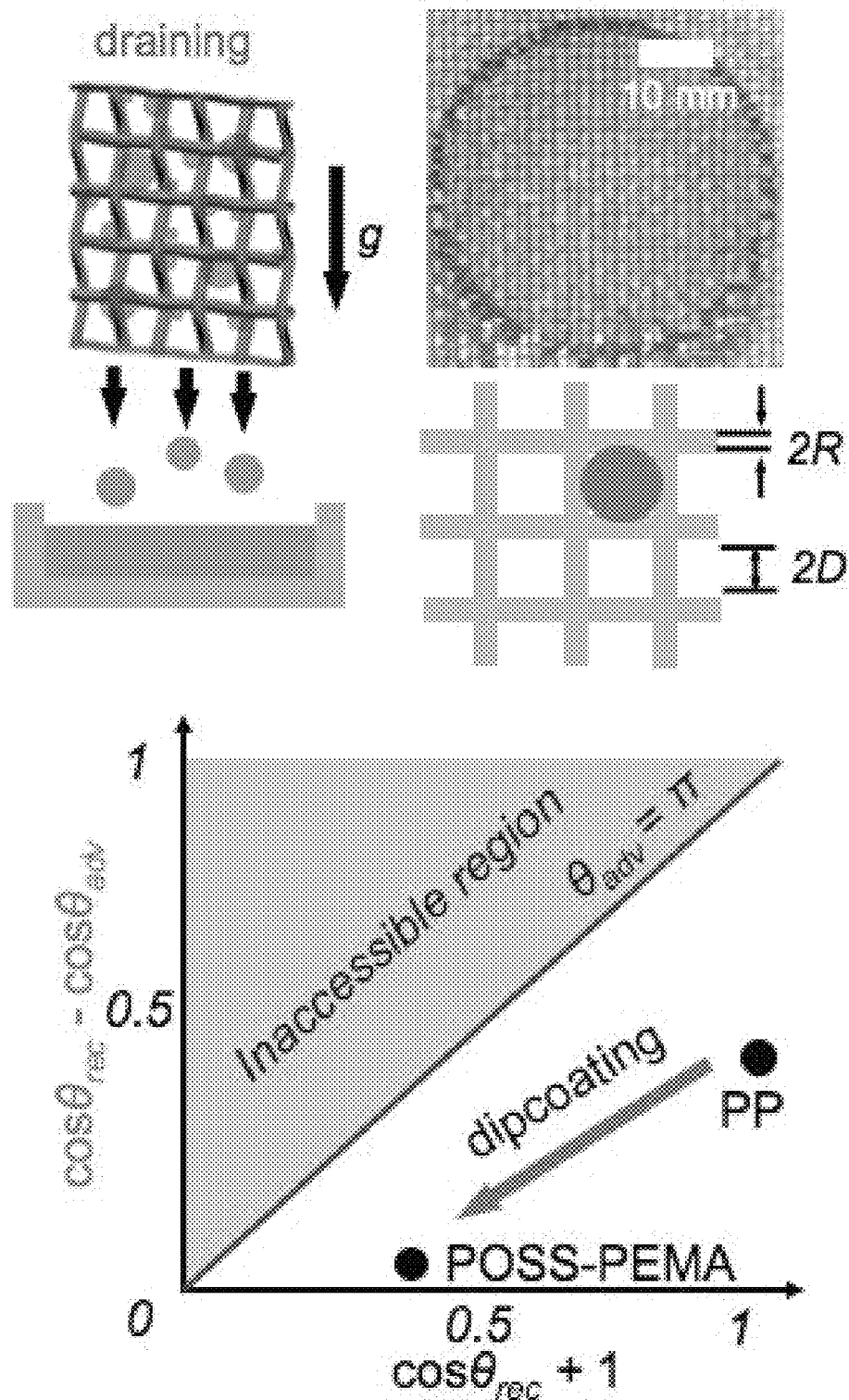
FIG. 5 illustrates clogging and bridging problems associated with draining of collected liquid and a how a coating having a low contact angle hysteresis and a high receding contact angle can address these problems.

In FIG. 4, the x-axis is the ratio of fog droplet radius to the radius of the mesh wire ($r_{fog}/R$), and the y-axis is the spacing ratio ((R+D)/R), so for a given fog condition (fixed $r_{fog}$), each positively sloped line through the origin represents a unique mesh spacing. In FIG. 5, the critical mesh opening size for PP (left panel) and POSS-PEMA (right panel) are represented on the contour plots for the expected aerodynamic efficiency of fog harvesting.

Figure 6A:
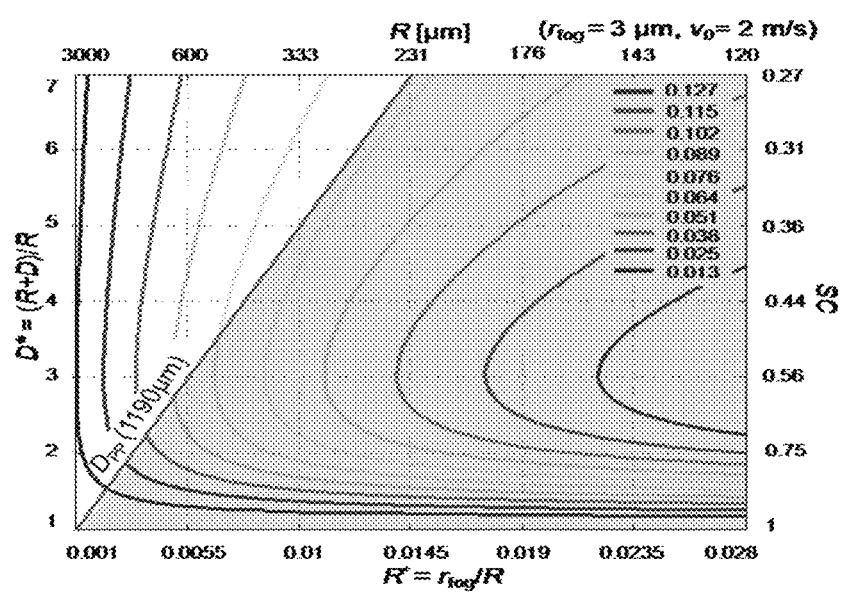
FIGS. 6A-6B show contour plots of fog harvesting efficiency of woven mesh surfaces with either (FIG. 6A) a polypropylene (PP) coating, or (FIG. 6B) a POSS-PEMA coating.
Figure 6B:
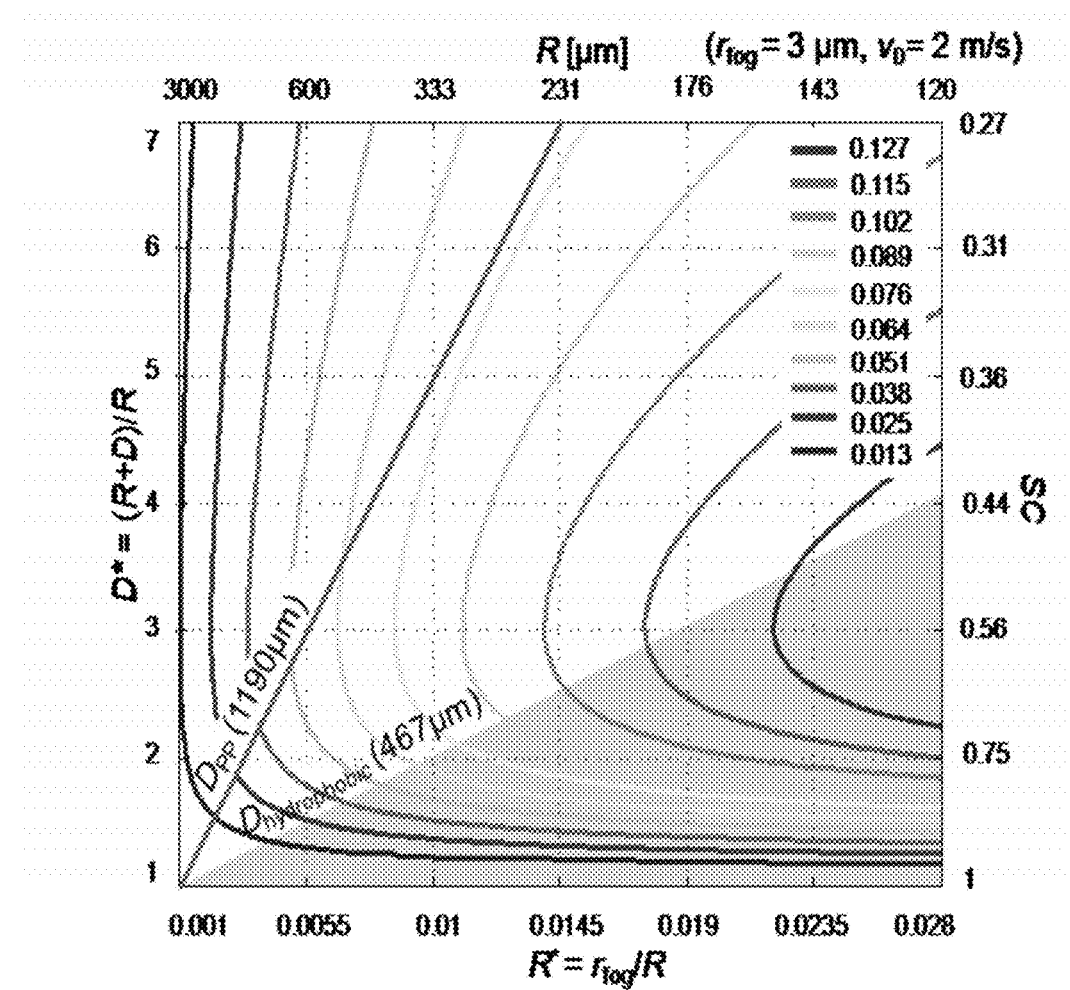

Consider a mesh with a PP material/coating with a critical opening size of 1190 μm, as shown in the left panel of FIG. 6 (FIG. 6A). For any point to the right of the limiting spacing (i.e., any point in the shaded region), the mesh is expected to clog with liquid droplets; consequently, the mesh will never reach its predicted efficiency in collecting droplets. The overall efficiency of fog harvesting is the product of the two sequential processes (1) the collection of fog droplets on mesh surfaces, and (2) the drainage of water from the mesh to a storage tank. For points in the shaded region, the efficiency of fog impaction might be higher, but the drainage efficiency decreases significantly and therefore, the overall fog harvesting efficiency will not improve. Due to this restriction, the higher efficiency portion of the design space cannot be fully utilized and at best 6% efficiency can be obtained with a PP coating.

However, a POSS-PEMA coating with smaller contact angle hysteresis (than PP) has a lower critical opening size, and therefore, a significantly higher fraction of the design space is free of clogging and drainage limitations. Therefore, a mesh surface with smaller radius (smaller R) and a correspondingly more effective value of D* could be chosen. An appropriately chosen POSS-PEMA coated mesh will have an expected aerodynamic efficiency of about 12-13%, as shown in the right side of FIG. 6B.

Therefore, changing the surface chemistry from PP to POSS-PEMA allowed the choice of a surface texture with double the overall expected efficiency. The triangular wedge shaped portions between the two straight lines shown in FIG. 6B was not accessible with a PP coating, but was available if the meshes were coated with POSS-PEMA.

Figure 7:
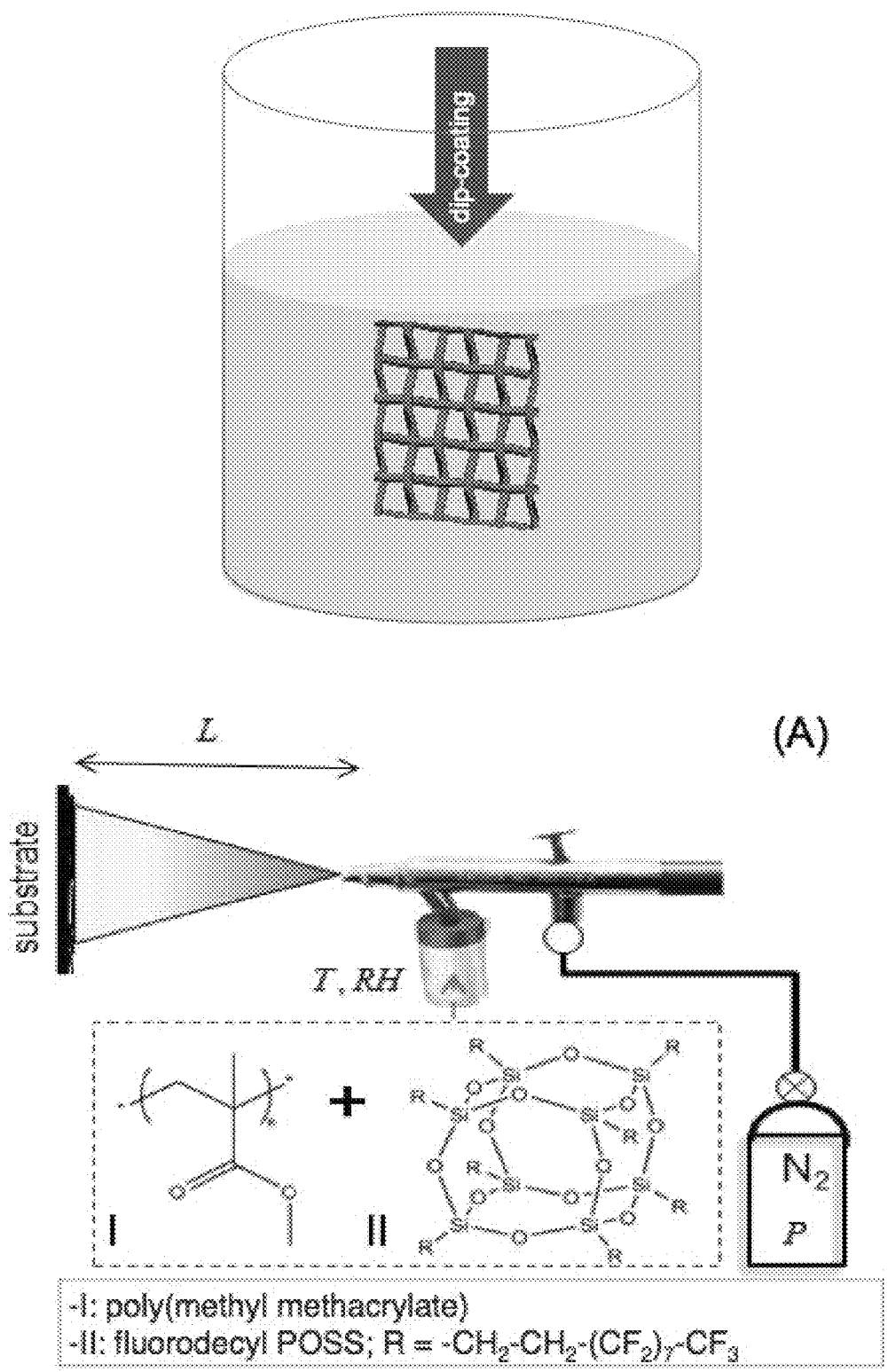
FIG. 7 illustrates a fabrication process of liquid-collecting permeable surfaces with different wettability by dip-coating and spray-coating.
Figure 8:
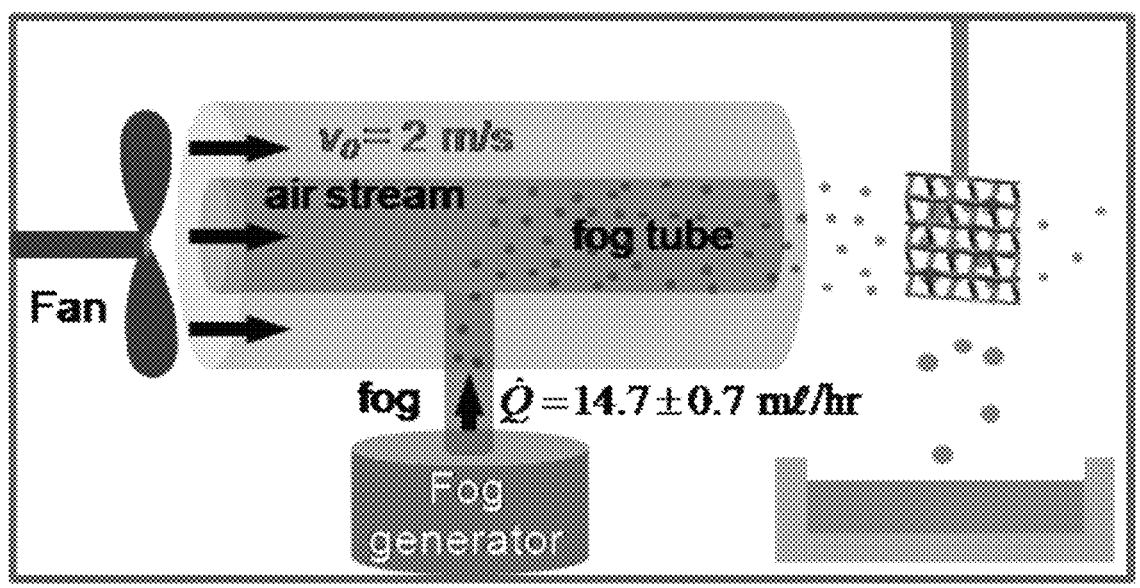
FIG. 8 is a schematic depiction of an artificial fog harvesting experimental setup. The experiments were carried out in a humidity chamber at T=26° C., and a relative humidity of 100% to eliminate the effects of condensation and evaporation of water.

With this mechanistic understanding of fog harvesting, the model was tested with a set of woven wire meshes. The results were compared to those obtained with a polypropylene Raschel mesh, which has been used in the field to harvest fog. The comparison therefore provides a good benchmark to compare performance to actual deployments in the field. The woven wire meshes were dip-coated in a 50% POSS-50% PEMA solution (total solids=10 g/l) for 5 minutes, then air-dried and annealed in an oven at 60° C. for half an hour, as shown in FIG. 7. The mesh samples were tested using an artificially generated fog environment, as schematically shown in FIG. 8.

Materials and Methods Preparation of Meshes. Raschel mesh samples with 35% shade coefficient were procured from Fogquest volunteers in Chile and were cut into 30 mm by 30 mm pieces. To keep the Raschel mesh flat and to ensure that the meshes are normal to the direction of fog stream, the three edges of square planar mesh were supported by a metal wire frame with diameter of 127 μm. Sample wire meshes surfaces were prepared by cutting commercially available wire meshes (McMaster-Carr, Corrosion-Resistant Type 304 Stainless Steel Woven Wire Cloth) into the same square planar shape with 30 mm side.

Figure 9A:
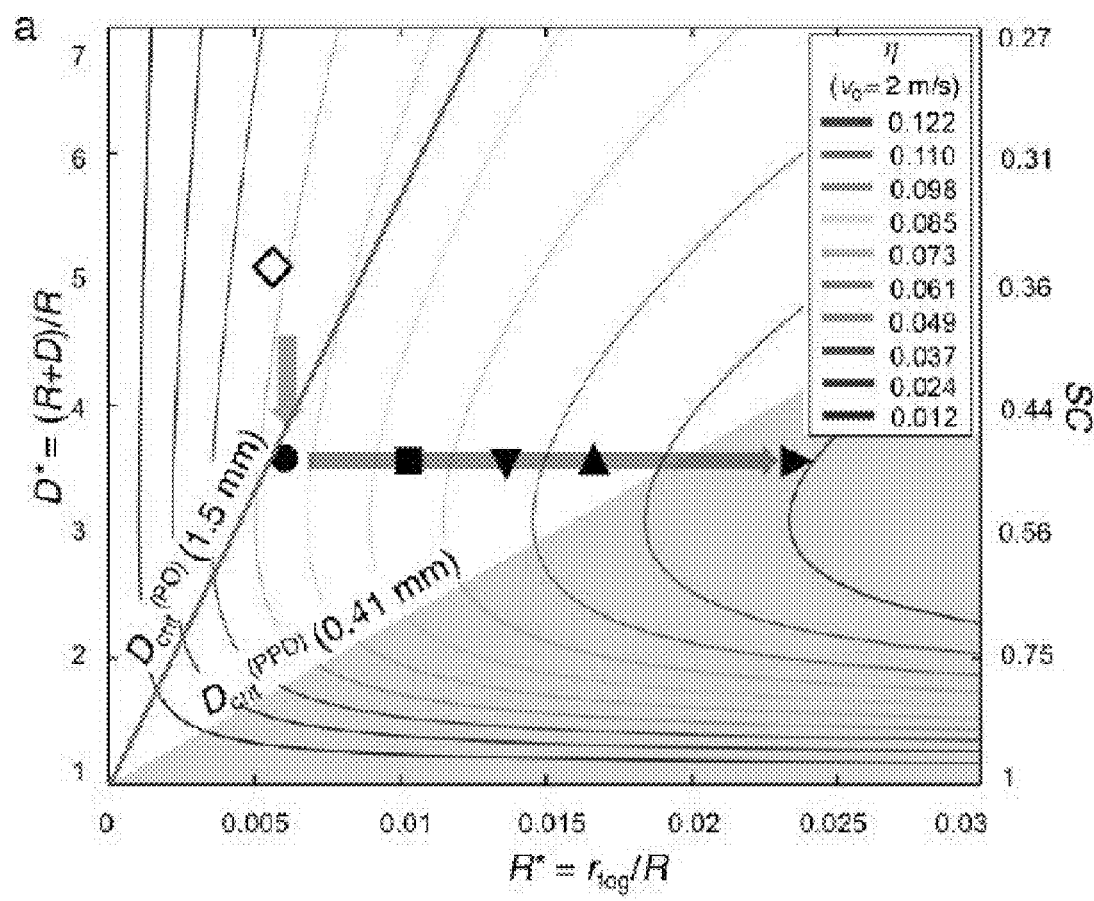
FIGS. 9A-9D illustrate results of fog harvesting experiments with woven wire meshes of different dimensions and surface coatings.
Figure 9B:
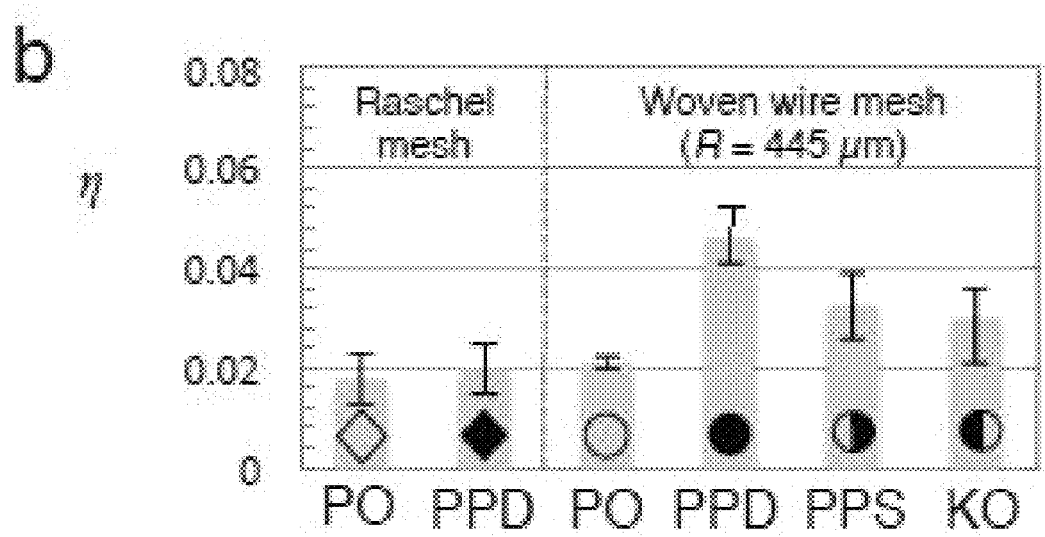

Polyolefin emulant coating (denoted by PO in FIGS. 3E, 9B). It has been shown that by tuning the relative concentration of the FluoroPOSS species and a compatible polymer binder (eg PEMA) the wettability characteristics of a dip-coated surface can be tuned over a wide range (see, for example, Meuler A J, Chhatre S S, Nieves A R, Mabry J M, Cohen R E, et al.(2011) Examination of wettability and surface energy in fluorodecyl POSS/polymer blends. Soft Matter 7:10122-10134). To generate a coated wire mesh that closely mimics the surface properties of the polyolefin Raschel mesh, the as-received wire mesh was dip-coated using a 1.7 wt. % 1H,1H,2H,2H-heptadecafluorodecyl polyhedral oligomeric silsesquioxane (fluorodecyl POSS) 98.3 wt. % poly(ethyl methacrylate) (PEMA, Mw=515 kDa, Sigma Aldrich) solution in a volatile hydrochlorofluorocarbon solvent (Asahiklin AK-225, Asahi Glass Company) at a concentration of 10 mg/mL. The meshes were dipped for 5 minutes, and then air-dried to evaporate the solvent. Uniformity of the coating was checked by scanning electron microscope (SEM) and by contact angle measurements at multiple locations on the surface.

POSS-PEMA dipcoating (denoted by PPD). Mesh samples were dip-coated using a 50 wt. % fluorodecyl POSS 50 wt. % PEMA solution in Asahiklin at a concentration of 10 mg/mL. The meshes were dipped for 5 minutes, and then air-dried to evaporate the solvent, resulting in a smooth superhydrophobic coating.

Figure 12:
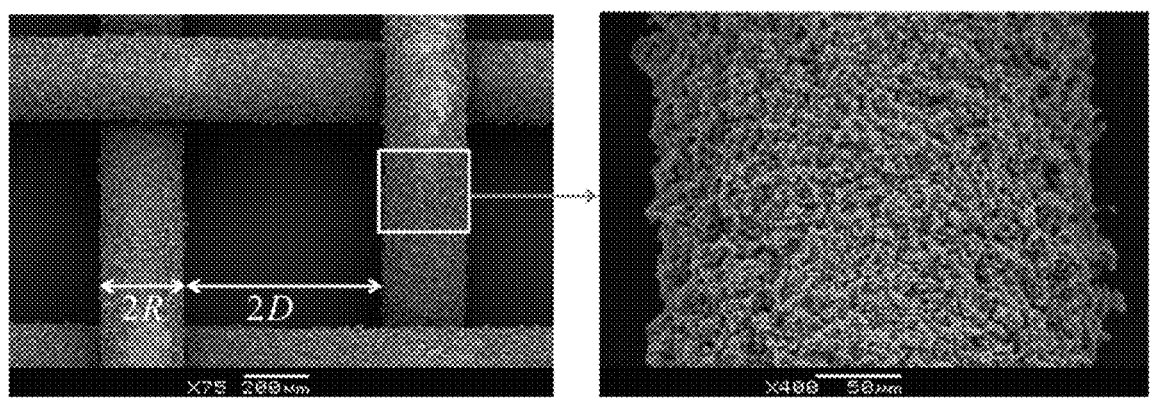
FIG. 12 is a micrograph depicting a coated mesh.

POSS-PEMA spraycoating (denoted by PPS). A 50 wt. % fluorodecyl POSS 50 wt. % PEMA solution was prepared in Asahiklin at a concentration of 50 mg/mL. The superhydrophobic spray-coated meshes were prepared by spray deposition of the polymer solution using an air spray-brush (McMaster-Carr) using a pressurized nitrogen stream to produce a re-entrant microtexture with very low contact angle hysteresis (see, for example, Srinivasan S, Chhatre S S, Mabry J M, Cohen R E, McKinley G H (2011) Solution spraying of poly(methyl methacrylate) blends to fabricate microtextured, superoleophobic surfaces. Polymer 52:3209-3218). A representative micrograph of the spray-coated mesh is shown in FIG. 12.

Liquid Impregnated surfaces (denoted by KO). The spray-coated meshes were immersed into nonvolatile Krytox oil ($\gamma_{LV}$=17 mN/m at 25° C., μ≈113 mPa·s at 20° C., DuPont) using a DCAT 11 (DataPhysics Instruments) tensiometer at a rate of 0.5 mm/min and then retracted at the same speed. A thin film of fluorinated Krytox oil remains imbibed into the porous spraycoated texture after the mesh is completely withdrawn from the oil bath, resulting in a 'SLIPS' surface with very low contact angle hysteresis (see, for example, Quere D (2005) Non-sticking drops. Rep. Prog. Phys. 68:2495-2532; Wong T -S, Kang S H, Tang S K Y, Smythe E J, Hatton B D, et al. (2011) Bioinspired self-repairing slippery surfaces with pressure-stable omniphobicity. Nature 477:443-447; and Smith J D, Dhiman R, Anand S, Garduno E, Cohen R E, et al. (In press) Droplet mobility on lubricant-impregnated surfaces. Soft Matter).

Experimental Procedure. All fog collection experiments were performed at a relative humidity of RH=100% and temperature of 26.4±0.5° C. in a controlled-humidity glove box (environmental chamber, Electro-Tech Systems, Inc.) to eliminate evaporation and condensation. Each sample was positioned 10 mm in front of the end of two plastic concentric cylinders with different diameters of 100 mm and 20 mm, respectively. As shown in FIG. 7, fog droplets ($r_{fog}$=3 μm) created from a nebulizer (Omron Compair XLT Nebulizer Compressor Kit NE-C25, Q=16 mL/hr) were convected towards the mesh sample by a wind stream of velocity $v_0$≈2 m/s, generated by a speed-tunable fan (Thermaltake Mobile Fan II External USB Cooling Fan). The concentric axis of the two cylinders and axes of symmetry of meshes and container were aligned to be on the same vertical plane. The mass of water collected in the container with dimension of 50 mm by 50 mm located 50 mm under the mesh samples was measured every hour for Raschel meshes and every 30 minutes for wire woven meshes to quantify the time evolution of efficiency. Once the efficiency reached the asymptotic value, the readings from at least three consecutive experiments were averaged to calculate the fog collection efficiency.

The fog harvesting results are summarized in FIG. 9 and Table 1.

TABLE 1

| | Wind velocity [m/s] | Average droplet size [μm] | Theoretical collection efficiency [%]† | Input water flow rate [L/m²/day] | Collected water [L/m²/day] | Measured efficiency [%] |
|---|---|---|---|---|---|---|
| Humid chamber experiment (single Raschel mesh) | 2 | 3 | 5.1 | 317.5 | 6.5 | 1.8 |
| Humid chamber experiment (double Raschel mesh) | 2 | 3 | 6.2 | 317.5 | NA | NA |
| Humid chamber experiment (POSS-PEMA coated wire mesh, R = 127 μm, D* = 3.5) | 2 | 3 | 13.8 | 317.5 | 31.4 | 9.9 |
| Chilean Fog Condition (double Raschel mesh) | 8 | 6 | 16.3 | ~77.8 | 0.2-10 | 0.25-12.8 |
| Chilean Fog Condition (POSS-PEMA coated wire mesh, R = 127 μm, D* = 3.5) | 8 | 6 | 21.4 | ~77.8 | 11.9‡ | 15.3‡ |

‡computed using the framework and data under lab conditions.
†assuming no drainage limitations.
Lab results were translated into L/m²/day assuming uniform fog harvesting for 24 hours Guided by this framework relating surface wettability and fog harvesting performance, a set of parametric experiments were performed using a family of simple woven meshes with a range of surface coatings (see below section for details). Results were benchmarked against the canonical Raschel mesh, using an artificially generated laboratory fog. These results are summarized in FIG. 9 and Table 1. As shown in Table 1, for most coating materials (cos $\theta_{rec,e}$−1), $r_e \gg r_c$, and $r_e$ does not impact the fog collection efficiency. For a given fog condition (i.e., fixed $r_{fog}$) the critical mesh half spacing with a given coating to prevent the clogging and re-entrainment problems ($r_c$=$D_{crit}$<D<$r_e$) can be represented as a line ($D^*$=(D/$r_{fog}$)R*+1) through the origin with positive slope D/$r_{fog}$. Therefore the high efficiency region to the right of these lines are inaccessible due to clogging (i.e. in this region of FIG. 9A the mesh openings are too small D<$r_c$ and the clogged mesh grids become impermeable). A first study is of the polyolefin Raschel mesh (with large CAH, and a critical opening size $D_{crit}^{(PO)}$≈1.5 mm). Because of the clogging constraint, large portions of the design space with the highest efficiency cannot be accessed and, at best, a theoretical efficiency of 5% efficiency can be obtained. As shown in FIG. 9B, the measured fog-harvesting efficiency of a Raschel mesh (D*≈5.1) was η≈2%, under simulated fog conditions.

The locus of the conventional polyolefin Raschel mesh in the design space of FIG. 9A is shown by the open diamond. Because it lies above the critical clogging line (i.e., $D_{Raschel}$>$D_{crit}^{(PO)}$≈1.5 mm) it is not prone to clogging. Additional dipcoating of the Raschel mesh with a POSS-PEMA coating therefore does not appreciably enhance its fog collection performance (sample ♦ shown in FIG. 9B with η=2±0.5%). To access the regions of higher efficiency, it is clear from these resultes that meshes with higher R* are required. Surfaces that are dipcoated in POSS-PEMA (to achieve smaller CAH) have a lower critical opening size $D_{crit}^{(PPD)}$≈0.41 mm, and therefore, a significantly higher fraction of the design space is free of clogging and drainage limitations. As a result, meshes that were previously unusable with thinner fibers (higher R*) and higher shade coefficients closer to the optimal value can now be employed for fog harvesting. These finer meshes are predicted to have much higher fog collection efficiencies (η≈12%), provided a suitable low hysteresis coating is applied.

In FIG. 9B, the role of surface coating alone for a particular mesh geometry is examined. The measured efficiency increases from η≈2% (for a woven mesh that is dip-coated to achieve the same surface wettability characteristics as the polyolefin Raschel mesh) to η≈5% for a POSS-PEMA dip-coated woven mesh (PPD, ●) with the same radius R≈445 μm and the same shade coefficient SC≈0.5 (D*≈3.5). However, the fog-collecting efficiency of a sprayed texture (PPS, ◐)) and liquid-impregnated surface (KO, ◯) woven mesh (again with the same R≈445 μm) do not perform as well as the dip-coated mesh due to the predominance of re-entrainment and clogging. Interaction with water droplets impacting and sliding along the Krytox-impregnated 'SLIPS surface' results in a progressive loss of the nonvolatile impregnating liquid (see FIG. 13 for details). This leads to increasing contact angle hysteresis and the mesh openings start to clog. Optimization studies focused on the dip-coated surfaces as they tend to be stable over much longer timescales.

Figure 9C:
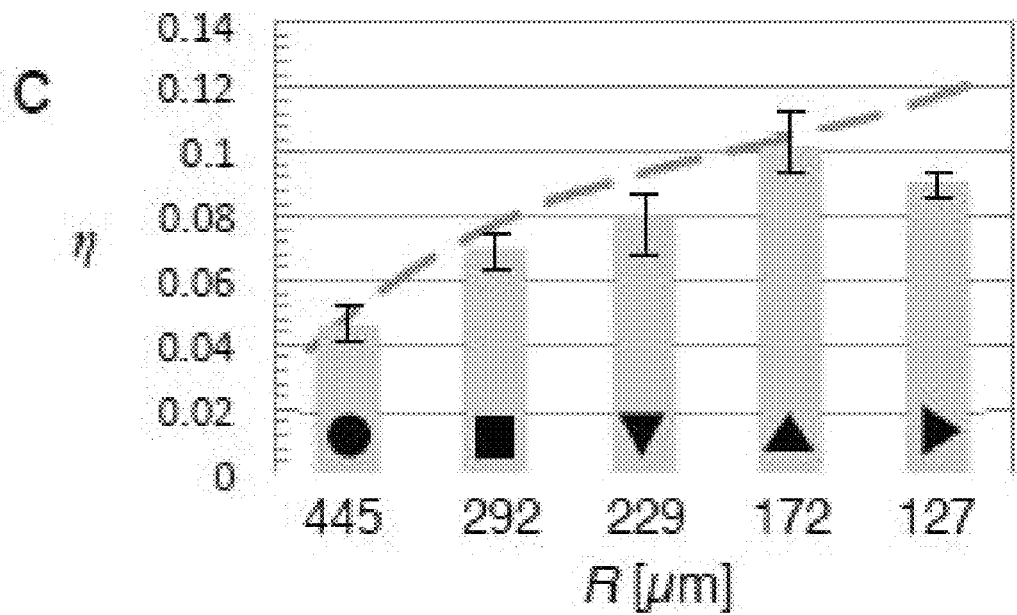

In FIG. 9C, the fog-collecting efficiency is plotted against the wire radius, keeping the weave constant (D*≈3.5) with the same surface coating (dip-coated with POSS-PEMA). The theoretical fog collecting efficiency η(R,D) given by the analysis in eq. (1) above (broken line) provides a good estimate of the observed trends. The measured efficiency increases monotonically from 5% to 10% as the fiber radius decreases from R≈445 μm to R≈172 μm for the first 4 meshes (●, ■, ▼, and ▲) that lie in the region of the design chart where clogging is not a limiting factor. However, the finest mesh (R≈127 μm, ▶) is located inside the hysteresis-limited region (with mesh spacing D<$D_{crit}$=$r_c$), and clogging once again prohibits any further increase in the efficiency. A mesh located in the clogging-prone region of the design space still collects an appreciable amount of fog, but its efficiency could be improved still further by reducing the clogging constraint imposed by eq.(3) (i.e., lowering the slope of the bounding line for $D_{crit}$, via lower values of CAH).

Figure 9D:
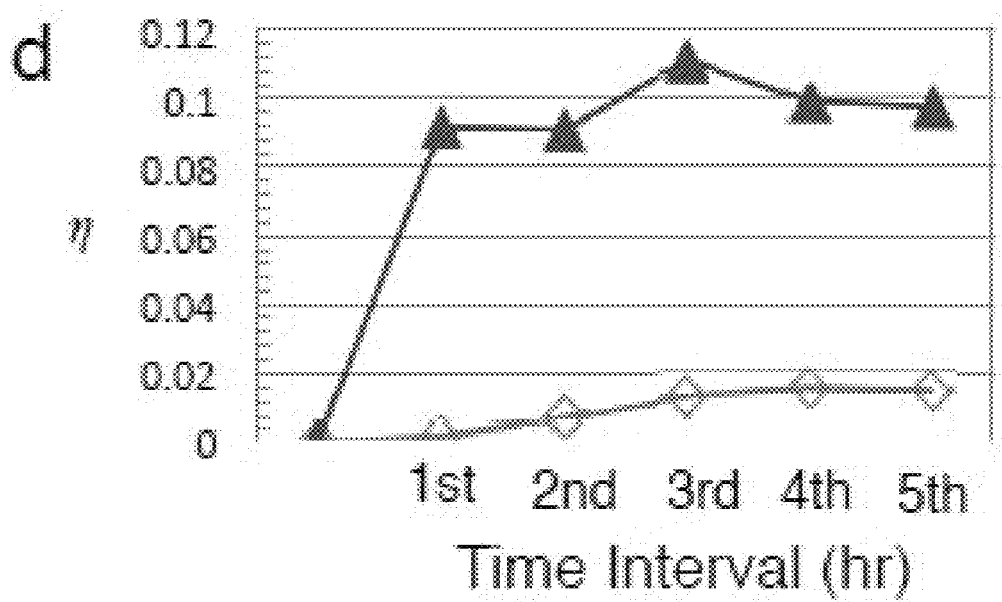

The maximum fog harvesting efficiency observed in the experiments is η=9.9±0.5% (N=3) for a fine POSS-PEMA dipcoated mesh with close to optimal weave (R≈172 μm, D*≈3.5, CAH≈0.06, ▲). In FIG. 9D, the time evolution of the fog harvesting performance for the optimal mesh and the Raschel mesh is compared over many hours. The optimized wire mesh collects water at a faster rate and also reaches steady state faster than the Raschel mesh. Thus, by an appropriate choice of the surface texture and coating chemistry, the fog harvesting efficiency for representative fog conditions ($v_0=2$ m/s, $r_{fog}=3$ μm) has been enhanced approximately five-fold.

A comparison of theoretical fog collection efficiency across many fog conditions (see below) indicates that the fog harvesting efficiency for the POSS-PEMA dipcoated wire mesh (R≈172 μm, ▲) is also more robust than the conventional Raschel mesh to changes in fog conditions ($1 \leq r_{fog} \leq 40$ μm, $\leq v_0 \leq 10$ m/s). As a result, fog harvesting technology based on POSS-PEMA dipcoated woven meshes may be deployable in many regions of the world where the size and velocity of fog droplets are not suitable for traditional Raschel meshes to work well. The performance of these rapidly-draining woven meshes are less susceptible to daily or seasonal changes of wind speed and direction, or temperature. Optimally-engineered surfaces can work effectively in foggy conditions for longer periods of time, and subsequently produce much more water; even in a mild fog with droplet radius of 3 μm, wind speed of 2 m/s and liquid water content of 0.1 g/m$^3$, the optimal mesh surface (R≈172 μm, ▲) can collect approximately two liters of water through an area of 1 m$^2$ per day. Using literature values for conditions in a typical Chilean fog environment (see, for example, Schemenauer R S, Joe P I (1989) The collection efficiency of a massive fog collector. Atmos. Res. 24:53-69, which is incorporated by reference in its entirety) and the design framework described here, the amount of water that can be collected using the optimal fog harvesting mesh can be estimated. Typical Chilean fog conditions are characterized by a larger droplet size and higher wind velocity ($r_{fog}$≈13 μm, $v_0$≈6 m/s) and in such inertial conditions, the collection rate is predicted to be as large as twelve liters of water through an area of 1 m$^2$ per day, assuming a liquid water content of 0.7 g/m$^3$. From such calculations it is clear that understanding the enabling roles of surface wettability in conjunction with the physical characteristics of the woven mesh geometry (i.e. fiber radius and shade coefficient) expands the accessible fog harvesting design space as well as future geographic opportunities for deploying fog harvesting technology.

Using the literature values for conditions in a typical fog environment in Chile, and the design framework presented above, the amounts of water that could be collected using a Raschel mesh and the optimal fog harvesting mesh were predicted. The results for fog environments in Chile and the lab were summarized in Table 1. From the last column of Table 1, it was clear that the optimal wire mesh was more efficient in collecting fog than a double layer Raschel mesh. Also, the Chilean fog conditions had a higher wind velocity and larger droplet size; in other words, the fog droplets had more inertia. In such inertial conditions, the woven mesh performed marginally better than the Raschel mesh (about 10% better than the best case scenario). However, under less inertial fog conditions (like those used in the lab), the woven meshes provided a significant advantage over the Raschel meshes. The relative advantage of this design framework was clarified further by comparing theoretical fog harvesting efficiencies of the Raschel mesh with optimally chosen woven mesh under a wide range of wind velocities and droplet radii, as plotted in FIG. 10.

Figure 10:
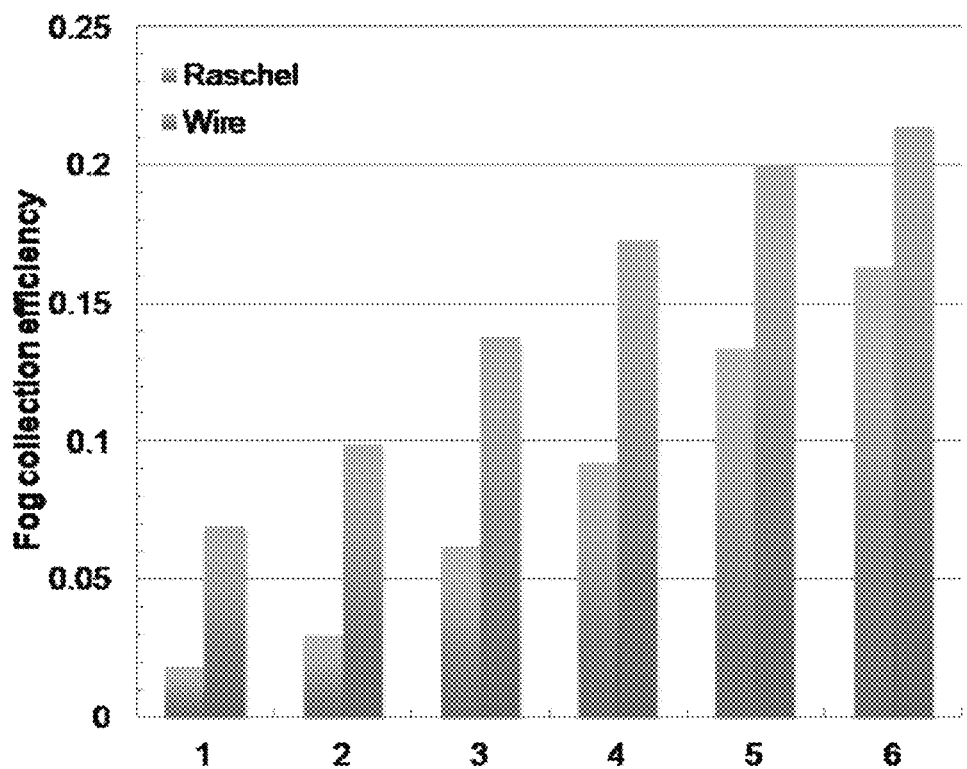
FIG. 10 is shows predicted fog harvesting efficiency for a double layered Raschel mesh (blue) and for a woven mesh with R=127 µm and D*=3.5 (red) under different conditions of fog droplet size and wind velocity. Velocities and fog droplet radii were: (1) 0.5 m/s and 3 µm; (2) 0.5 m/s and 6 µm; (3) 2 m/s and 3 µm (conditions used in lab experiments); (4) 2 m/s and 6 µm; (5) 8 m/s and 3 µm; and (6) 8 m/s and 6 µm (Chilean fog conditions).

As the wind velocity and droplet size increased from condition 1 to condition 6 (see FIG. 10), the fog became more inertial and theoretical collection efficiencies increased both for the Raschel mesh (indicated bars in FIG. 10) and the woven meshes (indicated bars in FIG. 10). Under all six fog conditions, the woven mesh was expected to perform significantly better than the Raschel mesh. However, the main advantage of the design framework was evident under non-inertial (light) fog conditions, i.e., conditions 1 and 2. The fog harvesting efficiency for the woven mesh was more robust to changes in fog conditions, so it did not deteriorate to the same extent as the Raschel mesh. As a result, the fog harvesting with woven meshes can be effectively used in a more places, e.g., where fog might not be dense enough for the Raschel meshes to work well. Nor are fog conditions at any one place constant; rather, they are expected to change based on the time of the day, temperature, wind patterns, season, and other factors. Accordingly, a permeable surface having properties chosen for the local conditions can produce more water than a generic surface. For example, condition 6 might be representative of Chilean fog at the peak of the winter. However, a woven mesh will work even when the fog is not as thick, as in the Chilean summer, when the conditions are similar to conditions 3 or 4. Higher efficiency at all fog conditions will help to collect more water, at more places, and over a longer part of the year, all of which benefits the economics of fog harvesting.

Figure 11:
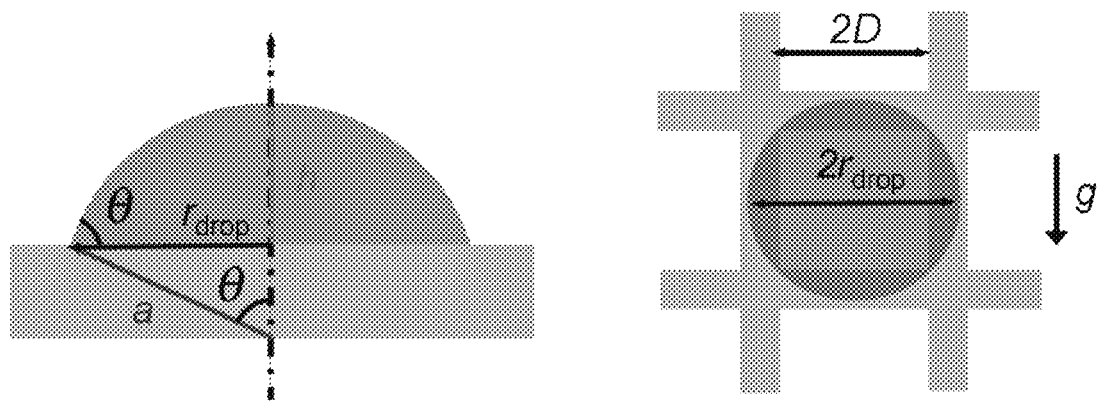
FIG. 11 is a schematic diagram depicting a water droplet on a cylindrical mesh filament.

Derivation of critical droplet radii $r_e$ and $r_c$. Two criteria for the critical radius of a droplet can be derived by equating the drag force acting on a drop to the adhesion force and secondly by equating gravitational force and pinning force based on contact angle hysteresis. FIG. 11 shows a schematic diagram of water droplets on a cylindrical mesh filament (cross-sectional view) and on one grid element of a woven mesh (top view). Both droplets are assumed to be spherical caps with the algebraic average of contact angles $\theta = \theta_{adv} + \theta_{rec}/2$.

The first critical droplet radius $r_e$ for re-entrainment of droplets into the airstream is a threshold value of the liquid droplet radius at which the aerodynamic drag force ($F_{drag}$) and the surface adhesion force ($F_{adhesion}$) acting on a water droplet (FIG. 11A) are balanced. To calculate the critical droplet radius $r_e$ the drag force exerted by wind on a fog droplet and the force of adhesion on the droplet exerted by the mesh were equate. First the drag force is obtained from the following equation, $$F_{drag} = \frac{1}{2} \rho_{air} v_0^2 C_D A_P \qquad \text{(eq. s1-1)}$$

where $\rho_{air}$ is the density of air, $v_0$ is the velocity of fog stream, $C_D$ is the drag coefficient (which typically ranges from 0.4 to 1 for a bluff body such as a droplet at Reynolds numbers of Re~$10^3$) and $A_P$ is the projected area normal to the direction of fog flow.

The projected area can be obtained by a simple trigonometric formula.

$$A_P = r_{drop}^2 (\theta - \sin\theta \cos\theta)/\sin^2\theta \qquad \text{(eq. s1-2)}$$

where $\theta$ is the algebraic average of advancing and receding contact angles $(\theta_{adv} + \theta_{rec})/2$.

On the other hand, the adhesion force on the liquid droplet is calculated in the following way—

$$F_{adhesion} = L_l \gamma_{LV}(1 + \cos\theta_{rec}) \qquad \text{(eq. s1-3)}$$

where $L_l$ is the characteristic length of the droplet ($2\pi r_{drop}$) and $\gamma_{LV}$ is the surface tension of water. Finally, by equating eqs s1-1 and s1-3 and substituting eq. s1-2 into eq. s1-1, the following equation for the critical radius $r_e$ is obtained.

$$r_e = 4\pi \gamma_{LV} \sin^2\theta (1 + \cos\theta_{rec})/\rho_{air} v_0^2 C_D (\theta - \sin\theta \cos\theta) \qquad \text{(eq. s1-4)}$$

If the droplet is not a spherical cap this will only change the precise form of f (θ) in eq. s1-4, but not the fundamental scaling or magnitude of the expression $$r_e (\gamma_{LV}/\rho_{air} v_0^2 C_D) f(\theta).$$

Similar expressions have been developed by Milne and Amirfazli for sheared droplets of water on airfoil surfaces. See Milne A J B, Amirfazli A (2009) Drop shedding by shear flow for hydrophilic to super-hydrophobic surfaces. Langmuir 25:14155-14164, which is incorporated by reference in its entirety.

The critical droplet radius $r_c$ for drainage of droplets from the mesh is found by balancing gravitational force ($F_{grav}$) and pinning force ($F_{CAH}$) acting on a water droplet that covers a single grid of the mesh (FIG. 11) is calculated here.

The gravitational force is expressed as—

$$F_{grav} = \rho_{water} g V \quad \text{(eq. s1-5)}$$

where $\rho_{water}$ is the density of water, g is the constant of gravity, and V is the volume of the spherical cap shaped water droplet. Using simple trigonometric algebra, $$V = \pi/6 h(3 r_{drop}^2 + h^2) \quad \text{(eq. s1-6)}$$

where h can be also expressed as $h = r_{drop}(1-\cos\theta)/\sin\theta$.

To calculate the critical radius of the water droplet that causes clogging on a mesh surface, the radius of a hemispherical droplet that covers a single square grid of mesh (or $r_{drop}=D$). In this case, the pinning force can be expressed as $$F_{CAH} \approx 2 r_{drop} \gamma_{LV} (\cos\theta_{rec} - \cos\theta_{adv}) \quad \text{(eq. s1-7)}$$

If the pinning force is smaller than the gravitational force, the droplet will be drained off the mesh, leading to a fresh unoccupied mesh grid for the next fog deposition cycle. Therefore, by equating eqs. s1-5 and s1-7, the critical radius at which clogging occurs.

$$r_c \approx \sqrt{\frac{12\gamma_{lv}(\cos\theta_{rec} - \cos\theta_{adv})}{\pi \rho_{water} g B(3+B^2)}} \quad \text{(eq. s1-8)}$$

where $$B = (1-\cos\theta)\sin\theta.$$

Once again, if the droplet is not a hemispherical cap this will change the precise form of eq. s1-8 but not the fundamental scaling $r_c \approx \sqrt{\gamma LV/\rho water g}\sqrt{CAH}$, where $CAH = \cos\theta_{rec} - \cos\theta_{adv}$.

Table 1 shows The values of the receding contact angle, contact angle hysteresis, and critical radii $r_e$ and $r_c$ for each surface coating, with the laboratory fog condition used in the humidity chamber experiment ($v_0 \approx 2$ m/s) and a representative value of $C_D=0.7$. For this airstream velocity, all four of the coatings show $r_c \ll r_e$. As a result of the large values of $\theta_{rec}$ (which lead to easy drop roll-off and low adhesion forces), the POSS-PEMA spraycoating (denoted PPS) shows a smaller value of $r_e$ than the half spacing D of most of the woven meshes used in the fog collection experiments, which explains the low collection efficiency value measured experimentally (because of re-entrainment of deposited water droplets back into the convected air stream). The liquid-impregnated surfaces initially exhibit a critical droplet drainage radius ($r_c$) that is similar to the POSS-PEMA dipcoating (denoted PPD), but after a short period of operation this ultimately transitions to a value that is greater than the original polyolefin material (denoted PO). A micrograph of the POSS-PEMA spraycoated mesh is shown FIG. 12.

TABLE 1

|  | Polyolefin (PO) | POSS-PEMA dipcoating (PPD) | POSS-PEMA spraycoating (PPS) | Liquid-impregnated coating (KO) |
|---|---|---|---|---|
| $\theta_{rec}$ (°) | 85 | 117 | 159 | 100 → 77 |
| CAH = $\cos\theta_{rec} - \cos\theta_{adv}$ | 0.396 | 0.061 | 0.006 | 0.034 → 0.632 |
| $r_e$ (mm) | 161 | 45 | 0.74 | 102 → 186 |
| $r_c$ (mm) | 1.5 | 0.41 | 0.030 | 0.42 → 2 |

Figure 13:
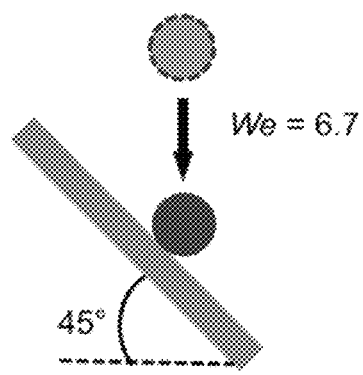
FIG. 13 is a diagram and graph depicting contact angles of water droplets on surfaces.
Figure 13:
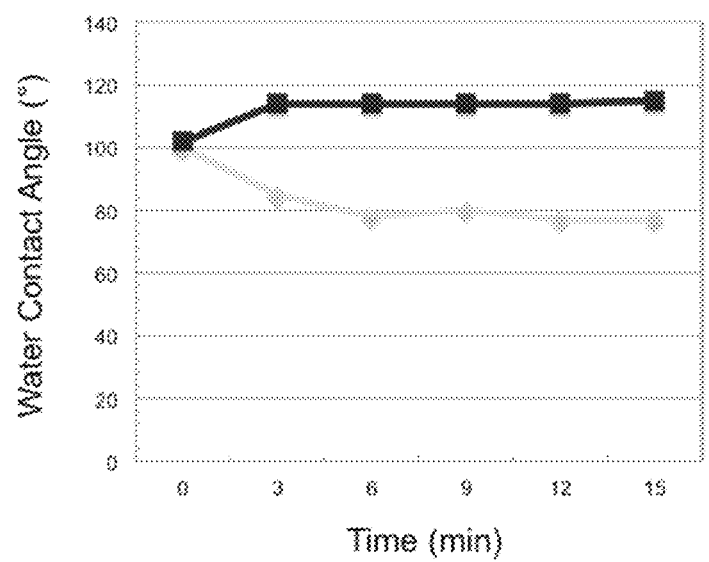

Time evolution of the performance of liquid-impregnated textured surfaces and schematic diagram of experimental setup for fog collection efficiency measurement Experimental details of the preparation of these surfaces are described in the Methods section. Repeated interaction with successive water droplets impacting and sliding along the liquid impregnated textured mesh surface (denoted by the label KO in FIG. 3E, 8) results in a progressive loss of the nonvolatile low surface tension liquid that is impregnated into the microtecture, as shown in FIG. 13, which shows the evolution of the advancing (dark line) and receding (light line) contact angles of water droplets on the liquid-impregnated surfaces. The contact angles were measured every three minutes while water droplets were released from a height of 10 mm (corresponding to impact velocity $v \approx 0.44$ m/s; We≈6.7) from the inclined surfaces (45°) with the flow rate of 3.3 ml/min (corresponding to 70 impacts per minute). This leads to a steady increase in the contact angle hysteresis (CAH) over a period of 5 mins and the mesh openings of the KO-impregnated mesh subsequently start to clog.

Other embodiments are within the scope of the following claims.

What is claimed is:

1. A device for collecting droplets of a liquid from an aerosol, comprising:

an aerosol-permeable structure including strands having a characteristic radius, and a characteristic spacing, a characteristic spacing ratio;

wherein the outermost surface of the strands comprises a material having a low contact angle hysteresis for the liquid, wherein the material and the characteristic spacing are selected such that liquid droplets adhered to the structure will drain from the structure under gravity.

2. The device of claim 1, wherein the characteristic radius is R, the characteristic spacing is 2D, and the spacing ratio is $D^* = (R+D)/R$, and the radius and the spacing are selected such that $2 \leq D^* \leq 4$.

3. The device of claim 1, wherein the spacing is selected such that $$r_e \approx \frac{4\pi\gamma_{lv}\sin^2\theta(1+\cos\theta_{rec})}{\rho_{air} v_0^2 C_D (\theta - \sin\theta\cos\theta)}$$

where $\gamma_{LV}$ is the surface tension of the liquid, $\theta = (\theta_{adv} + \theta_{rec})/2$ is the mean contact angle of the droplet on the surface, and $\theta_{adv}$, $\theta_{rec}$ are the advancing contact angle and receding contact angle, respectively, and $$r_c \approx \sqrt{\frac{12\gamma_{lv}(\cos\theta_{rec} - \cos\theta_{adv})}{\pi\rho_{water}gB(3+B^2)}} \quad (3)$$

where $B=(1-\cos\theta)/\sin\theta$, $\rho$ is the density of the liquid, and g is the gravitational constant.

4. The device of claim 1, wherein the liquid is water.

5. The device of claim 1, wherein the material is a hydrophobic material.

6. The device of claim 1, wherein the structure is a woven mesh.

7. The device of claim 1, wherein the material includes a polyhedral oligomeric silsesquioxane (POSS) and a poly(acrylate).

8. The device of claim 1, wherein the polyhedral oligomeric silsesquioxane (POSS) is a fluorinated polyhedral oligomeric silsesquioxane, and the poly(acrylate) is poly(methyl methacrylate), poly(ethyl methacrylate), or a combination thereof.

9. A method for collecting droplets of a liquid from an aerosol, comprising:
providing a device according to claim 1; and
contacting an aerosol including droplets of the liquid with the structure.

10. The method of claim 9, wherein the aerosol is fog.

11. The method of claim 9, further comprising providing a second device downwind of the first device.

12. A method of making a device for collecting droplets of a liquid from an aerosol, comprising:
identifying aerosol conditions, wherein the conditions include an average droplet size of the aerosol and a wind velocity of the aerosol;
selecting a characteristic radius, a characteristic spacing, and a characteristic spacing for strands of an aerosol-permeable structure, so as to provide efficient droplet collection for the identified conditions;
selecting a material having a low contact angle hysteresis for the liquid; and
applying the material to form the outermost surface of the strands,
wherein the material and the characteristic spacing are selected such that liquid droplets adhered to the structure will drain from the structure under gravity.

13. The method of claim 12, wherein the characteristic radius is R, the characteristic spacing is 2D, and the spacing ratio is $D^*=(R+D)/R$, and the radius and the spacing are selected such that $2 \leq D^* \leq 4$.

14. The method of claim 13, wherein the spacing is selected such that $$r_e \approx \frac{4\pi\gamma_{lv}\sin^2\theta(1+\cos\theta_{rec})}{\rho_{air}v_0^2 C_D(\theta - \sin\theta\cos\theta)}$$

where $\gamma_{LV}$ is the surface tension of the liquid, $\theta=(\theta_{adv}+\theta_{rec})/2$ is the mean contact angle of the droplet on the surface, and $\theta_{adv}$, $\theta_{rec}$ are the advancing contact angle and receding contact angle, respectively, and $$r_c \approx \sqrt{\frac{12\gamma_{lv}(\cos\theta_{rec} - \cos\theta_{adv})}{\pi\rho_{water}gB(3+B^2)}} \quad (3)$$

where $B=(1-\cos\theta)/\sin\theta$, $\rho$ is the density of the liquid, and g is the gravitational constant.

15. The method of claim 12, wherein the liquid is water.

16. The method of claim 12, wherein the material is a hydrophobic material.

17. The method of claim 12, wherein the structure is a woven mesh.

18. The method of claim 12, wherein the material includes a polyhedral oligomeric silsesquioxane (POSS) and a poly(acrylate).

19. The method of claim 12, wherein the polyhedral oligomeric silsesquioxane (POSS) is a fluorinated polyhedral oligomeric silsesquioxane, and the poly(acrylate) is poly(methyl methacrylate), poly(ethyl methacrylate), or a combination thereof.

* * * * *